(12) United States Patent
Ormazabal et al.

(10) Patent No.: US 8,046,828 B2
(45) Date of Patent: *Oct. 25, 2011

(54) SECURITY MANAGEMENT SYSTEM FOR MONITORING FIREWALL OPERATION

(75) Inventors: Gaston S. Ormazabal, New York, NY (US); Edward P. Harvey, Summit, NJ (US); James E. Sylvester, McLean, VA (US)

(73) Assignee: Verizon Services Corp., Ashburn, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/428,666

(22) Filed: Apr. 23, 2009

(65) Prior Publication Data

US 2009/0205039 A1 Aug. 13, 2009

Related U.S. Application Data

(63) Continuation of application No. 10/679,222, filed on Oct. 3, 2003, now Pat. No. 7,886,348.

(51) Int. Cl.
*G06F 9/00* (2006.01)
(52) U.S. Cl. ............................. 726/11; 726/13
(58) Field of Classification Search .................. 713/201; 726/11
See application file for complete search history.

(56) References Cited

U.S. PATENT DOCUMENTS

| | | | |
|---|---|---|---|
| 5,414,704 A | 5/1995 | Spinney | |
| 5,465,286 A | 11/1995 | Clare et al. | |
| 5,473,607 A | 12/1995 | Hausman et al. | |
| 5,828,653 A | 10/1998 | Goss | |
| 5,859,980 A | 1/1999 | Kalkunte | |
| 5,909,686 A | 6/1999 | Muller et al. | |
| 5,936,962 A | 8/1999 | Haddock et al. | |
| 5,991,270 A | 11/1999 | Zwan et al. | |
| 6,154,775 A | 11/2000 | Coss et al. | |
| 6,175,902 B1 | 1/2001 | Runaldue et al. | |
| 6,680,089 B2 | 1/2004 | Miyake et al. | |
| 6,701,346 B1 | 3/2004 | Klein | |
| 6,707,817 B1 | 3/2004 | Kadambi et al. | |
| 6,826,616 B2 | 11/2004 | Larson et al. | |
| 6,880,089 B1 | 4/2005 | Bommareddy et al. | |
| 6,920,107 B1 | 7/2005 | Qureshi et al. | |
| 6,934,756 B2 | 8/2005 | Maes | |
| 7,007,299 B2 | 2/2006 | Ioele et al. | |

(Continued)

OTHER PUBLICATIONS

Kuthan, J. et al., "Middlebox Communication: Framework and Requirements," Internet Engineering Task Force, draft-kuthanmidcom-framework-OO.txt, Nov. 2000, pp. 1-23.

(Continued)

*Primary Examiner* — Nasser Moazzami
*Assistant Examiner* — Carlton V Johnson

(57) ABSTRACT

A test method for Internet-Protocol packet networks that verifies the proper functioning of a dynamic pinhole filtering implementation as well as quantifying network vulnerability statistically, as pinholes are opened and closed is described. Specific potential security vulnerabilities that may be addressed through testing include: 1) excessive delay in opening pinholes, resulting in an unintentional denial of service; 2) excessive delay in closing pinholes, creating a closing delay window of vulnerability; 3) measurement of the length of various windows of vulnerability; 4) setting a threshold on a window of vulnerability such that it triggers an alert when a predetermined value is exceeded; 5) determination of incorrectly allocated pinholes, resulting in a denial of service; 6) determining the opening of extraneous pinhole/IP address combinations through a firewall which increase the network vulnerability through unrecognized backdoors; and 7) determining the inability to correlate call state information with dynamically established rules in the firewall.

15 Claims, 10 Drawing Sheets

U.S. PATENT DOCUMENTS

| | | | |
|---|---|---|---|
| 7,072,291 B1 | 7/2006 | Jagadeesan et al. | |
| 7,340,166 B1 | 3/2008 | Sylvester et al. | |
| 7,421,734 B2 | 9/2008 | Ormazabal et al. | |
| 7,440,573 B2 | 10/2008 | Lor et al. | |
| 7,499,405 B2 | 3/2009 | Gilfix et al. | |
| 7,634,249 B2 | 12/2009 | Hahn et al. | |
| 7,653,938 B1 | 1/2010 | Touitou et al. | |
| 7,672,336 B2 | 3/2010 | Bharrat et al. | |
| 7,716,725 B2 | 5/2010 | Xie | |
| 7,721,091 B2 | 5/2010 | Iyengar et al. | |
| 2002/0083187 A1 | 6/2002 | Sim et al. | |
| 2002/0112073 A1* | 8/2002 | MeLampy et al. | 709/240 |
| 2003/0055931 A1 | 3/2003 | Cravo De Almeida et al. | |
| 2003/0076780 A1 | 4/2003 | Loge et al. | |
| 2003/0093563 A1 | 5/2003 | Young et al. | |
| 2003/0115321 A1 | 6/2003 | Edmison et al. | |
| 2003/0126464 A1 | 7/2003 | McDaniel et al. | |
| 2003/0135639 A1 | 7/2003 | Marejka et al. | |
| 2003/0165136 A1 | 9/2003 | Cornelius et al. | |
| 2003/0195861 A1* | 10/2003 | McClure et al. | 707/1 |
| 2004/0013086 A1 | 1/2004 | Simon et al. | |
| 2004/0028035 A1 | 2/2004 | Read | |
| 2004/0039938 A1* | 2/2004 | Katz et al. | 713/201 |
| 2004/0068668 A1 | 4/2004 | Lor et al. | |
| 2004/0133772 A1 | 7/2004 | Render | |
| 2004/0136379 A1 | 7/2004 | Liao et al. | |
| 2004/0208186 A1 | 10/2004 | Eichen et al. | |
| 2004/0236966 A1 | 11/2004 | D'Souza et al. | |
| 2004/0244058 A1 | 12/2004 | Carlucci et al. | |
| 2005/0018618 A1 | 1/2005 | Mualem et al. | |
| 2005/0050377 A1 | 3/2005 | Chan et al. | |
| 2005/0076235 A1 | 4/2005 | Ormazabal et al. | |
| 2005/0165917 A1 | 7/2005 | Le et al. | |
| 2005/0232229 A1 | 10/2005 | Miyamoto et al. | |
| 2006/0007868 A1 | 1/2006 | Shinomiya | |
| 2006/0075084 A1 | 4/2006 | Lyon | |
| 2006/0077981 A1 | 4/2006 | Rogers | |
| 2006/0146792 A1 | 7/2006 | Ramachandran et al. | |
| 2006/0227766 A1 | 10/2006 | Mickle et al. | |
| 2007/0022479 A1 | 1/2007 | Sikdar et al. | |
| 2007/0110053 A1 | 5/2007 | Soni et al. | |
| 2007/0118894 A1 | 5/2007 | Bhatia | |
| 2007/0121596 A1 | 5/2007 | Kurapati et al. | |
| 2007/0192863 A1 | 8/2007 | Kapoor et al. | |
| 2008/0037447 A1 | 2/2008 | Garg et al. | |
| 2008/0040801 A1 | 2/2008 | Buriano et al. | |

OTHER PUBLICATIONS

Rosenberg et al., "SIP: Session Intiation Protocol", Internet Engineering Task Force, Request for Comments 3261, Jun. 2002.

* cited by examiner

SECURITY MANAGEMENT SYSTEM FOR MONITORING FIREWALL OPERATION

RELATED APPLICATIONS

The present application is a continuation of U.S. patent application Ser. No. 10/679,222 which was filed on Oct. 3, 2003 and which is hereby expressly incorporated by reference.

FIELD OF THE INVENTION

The present invention relates generally to the field of communications and, in particular, to methods and apparatus for testing certain security aspects of firewalls used in packet networks.

BACKGROUND OF THE INVENTION

The transmission of voice signals over a packet network offers economies of scale which make it likely that common carriers will, over time, evolve their circuit switched voice networks into converged services packet switched networks that will transport voice traffic in packets. The full realization of this voice over packet network paradigm, however, will likely be delayed until the security of the voice traffic carried over the packet network is improved to the point at which it rivals that of present day circuit switched networks.

A likely protocol to be employed in a voice over packet network is Internet Protocol, or more conveniently, IP. Accordingly, such networks are oftentimes referred to as voice over Internet Protocol networks (VoIP).

IP has become attractive for such applications, in part, because of its ubiquity. Unfortunately however, IP and networks designed thereon suffer from a lack of security as a legacy of how IP networks were originally designed with little or no security functions built in. Recent attempts to remedy the security deficiencies of IP have focused on protocol enhancements such as those which include the incorporation of IPSecurity (IPSec) at the Network Layer, and other schemes at the Application Layer (e.g., application security protocols).

In VoIP networks, these new security enhancements can be difficult to implement, either because of the distributed nature of VoIP networks (many hops), or because they frequently utilize digital certificate-based key systems which are difficult to manage—especially for large, common carrier size networks. One alternative is to protect crucial network assets, such as server farms of media gateways, signaling gateways, and softswitches by employing network perimeter protection devices that block unwanted and/or potentially nefarious traffic from reaching those assets. Unfortunately however, VoIP networks have specific requirements that make using traditional perimeter protection devices, such as firewalls, not practical as such devices, and in particular firewalls, typically block unwanted traffic on a specific IP port in a static manner, i.e., specific ports are allowed/excluded independent of time.

In a VoIP network, ports used to carry the media part of a call are normally dynamically assigned through signaling, released upon call termination, and reused for subsequent call(s) later. As a result, a scheme was designed that permitted firewalls to open and close ports dynamically, for a specific call, from signaling information obtained from a signaling channel at call setup and call termination. This scheme and related method(s) are sometimes referred to as "dynamic pinhole filtering", as the firewalls filter traffic dynamically by opening/closing ports (pinholes) depending upon the state and progress of a call. When implemented correctly at the network perimeter, dynamic pinhole filtering advantageously provides protection at a level of granularity not realizable through other current security technologies.

As can be appreciated, strict verification of the correctness of a dynamic pinhole filtering implementation is of paramount importance as a defective implementation could result in "windows of vulnerability" which could be maliciously exploited to invade the very assets being protected. Worse still, a partially correct implementation may contribute to a false sense of security, while leaving network assets exposed to malicious attack or takeover. Such windows of vulnerability can, in turn, be used by a malicious attacker for Denial of Service Attacks in simple cases. In more complex cases, such windows of vulnerability can be used by a malicious attacker to takeover network assets that can be used to control and disrupt other parts of the network.

Accordingly, a continuing need exists for methods that provide or otherwise facilitate the strict verification of security measures employed in VoIP networks, and in particular networks utilizing dynamic pinhole filtering. In particular, there is a need for methods of verifying firewall operation prior to deployment, a need for methods of determining the maximum loading that is possible on a firewall prior to an unacceptable degradation in security and/or service, and there is also a need for methods of monitoring a firewall while deployed in an active system to insure that it is operating properly with port opening and closing delays remaining within preselected limits.

SUMMARY OF THE INVENTION

The present invention is directed to firewall testing methods and apparatus. The results of the testing methods can be used to verify compliance of firewalls to design specifications and/or engineer firewalls to meet expected loading conditions while providing the desired level of responsiveness, e.g., in terms of port opening and closing times. The methods and apparatus of the present invention can also be used to monitor and test a firewall system while in use in a network application. Failures of various tests, e.g., excessive port opening and/or closing times, are detected and reported to a management system. The management system responds to such alarms by limiting traffic flow, redirecting traffic, performing time and space correlations, root cause analyses, and/or notifying the system administrators of the problem.

The testing methods and apparatus of the invention are well suited for testing firewalls which open and close ports in a dynamic manner to support VoIP calls.

Among the features to which the present invention is directed are 1) test apparatus and a testing system; 2) testing methods involving: a) checking whether firewall ports are open and/or closed as dictated by various firewall rules and/or b) opening and/or closing delays associated with opening and closing ports in response to session signals used to establish and/or terminate media sessions; 3) determining the effect of increasing traffic loads, e.g., session signaling loads, on firewall port opening and/or closing delays; and 4) the monitoring of an active firewall to a) detect the effect of traffic loading on port opening and/or closing delays, b) generate an alarm when a detected opening and/or closing delay exceeds a preselected threshold; and c) taking one or more actions in response to a generated port opening or closing delay alarm to reduce the load on the firewall to which the alarm corresponds and/or take other measures to ensure that firewall security is maintained. Additionally, by way of example, a time/spatial fault detector coupled with a root-cause analysis engine could help sectionalize in time and space where and when one or more security violations have occurred in a large network. This may be done by correlating the output of various port opening and closing delay time monitoring devices deployed throughout the network to determine the cause and locality of actions which interfere with proper firewall operation. The time/spatial fault detector and root-cause analysis engine are, in some embodiments, included in a security management system which receives input from multiple firewalls and/or monitoring systems distributed throughout the network.

A test system implemented in accordance with the invention includes at least two novel test apparatus of the present invention, referred to as an Integrated Intelligent End Points (IIEPs). At least one of the test apparatus includes a traffic generator, e.g., a session signal generator, and a probe signal generator. The traffic generation module, included in an IIEP, is used for generating call and/or other media traffic as part of the test process. The probe signal generator module is used to generate test signals which are used to probe whether ports are opened and/or closed. Each EEP also normally includes a traffic/probe signal analysis and/or report generation module included that is used to perform analysis on signals, e.g., probe signals, detected passing through the firewall. A timing/synchronization module is included in each of IIEP. The timing/synchronization module is used to synchronize the timing of the IIEP, e.g., to an external clock source or another IIEP.

An originating IIEP is positioned "outside" of the firewall within an untrusted zone and a target IIEP is positioned "inside" of the firewall within a trusted zone. The two devices work together to test the firewall's operation. Each IIEP includes "intelligence", e.g., control logic and/or software routines which allow the analysis module and various other modules, such as traffic generation and probe signal generation modules, to work together in a coherent manner and to interoperate with other IIEPs to implement the testing method of the present invention which will be discussed in detail below.

Thus, the test apparatus of the present invention includes traffic and probe signal generators located in the untrusted zone outside a firewall and an analysis device located inside a trusted zone positioned behind the firewall. The probe test signal generator and the analysis device, e.g., analysis module of the IIEP located in the trusted zone, operate in a synchronized manner, with the probe test generator directing test signals at the firewall's ports, which may be used for media traffic, and the analysis device looking to determine what test signals, if any, pass through the ports and whether such signals should have been allowed through the firewall in accordance with the firewall rules. Such rules may include rejecting signals from source devices having IP addresses which have not been legitimated to the firewall, e.g., not associated with an ongoing media session through the use of session signaling. The firewall rules may also include rejecting traffic directed from a device having a legitimate IP address but which is directed to a port which should not be open. Firewall processing will also normally involve dynamically opening and closing ports in the firewall for media sessions, e.g., voice or data sessions, associated with an IP address that has been legitimated through the use of appropriate session establishment signaling.

In accordance with one feature of the invention, the ability of a firewall to block media signals corresponding to a source address which has not been legitimated through session signaling is tested by directing traffic at the firewall's media ports from an IP address which has not been associated by the firewall with an active media session. Signals which are allowed to pass through the firewall's media ports from the source that does not have an IP address associated with an ongoing media session are detected and interpreted as indications that the firewall filtering on IP addresses is not working properly.

In addition to address filtering, port filtering is also tested. The combination of IP address and port identifier is used to identify the port to be accessed. An IP address is legitimated with the firewall by initiating a media session, e.g., a call. A pair of ports are opened, assuming proper firewall operation for the legitimated IP address, for the initiated call while the other ports that may be associated with the legitimated IP address, and used for media signals, should remain closed. To test the port filtering, test signals are directed at the firewall's full range of ports using the legitimated IP address as the source address for the test signals. The test signals should pass the IP address filtering portion of the firewall filtering process but should be rejected based on the port portion of the testing process with the exception of the signals directed to the ports that were associated with the established call. The analysis device monitors during this phase of the testing process for signals passing through the firewall and notes any ports through which a signal is received as an open port. The generated list of detected open ports is compared to a list of ports associated with the source IP address which should be open, e.g., the ports assigned to the ongoing call. Ports through which signals were received that should not have been open are identified as erroneously open ports. If a port should have been open, and it is a port for traffic going in the direction of the analysis device, and a signal was not received through the port, the port is identified as being erroneously closed. The testing of the port open/closed status for the legitimated IP address is indicative of how the firewall would respond to signals directed from another legitimated IP address to such ports In addition to IP address and basic port filtering, the rate at which ports are opened and closed in response to session establishment and session termination signals, e.g., traffic signals, is monitored. Probe test signals are directed at the firewall's ports associated with a source IP address that was used to initiate a call or other media session. The time between the session establishment signal, which should trigger port opening, and the time a port corresponding to the session being established is opened is measured. In various embodiments this is done by detecting the time between the signal which should cause a port to open and the time a test probe signal passes through the firewall port associated with the established session as detected by the analysis device located on the trusted side of the firewall. Port closing delay is tested in a similar manner with the analysis module measuring the time delay between a session signal which should cause the port corresponding to an established session to close and the time probe test signals cease passing through the port associated with the terminated session.

To generate a more representative measure of opening and closing delays, multiple calls may be initiated and then terminated. The multiple calls may each have the same source IP address but use, e.g., be assigned to, different ports in the firewall. The calls may be initiated and terminated in parallel. The measured opening delays corresponding to the multiple calls can, and in various embodiments are, statistically averaged to generate an average measured opening delay. Similarly measured closing delays corresponding to the multiple calls can, and in various embodiments are, statistically averaged to generate an average measured opening delay. Plots of opening and closing delays, e.g., average delays, measured under different system conditions or measured for different systems may be generated and used as an engineering tool in accordance with the invention.

The effect of traffic loading is tested in various embodiments by increasing firewall traffic, e.g., session signaling which triggers the opening and/or closing ports, and measuring the corresponding opening and closing delays for different traffic loads. A given firewall may be specified with maximum acceptable port opening and/or closing delay threshold values, e.g., pinhole opening and/or closing delay threshold times. It is possible, based on testing, in accordance with the present invention, to determine the maximum traffic load for the given firewall before the operational opening and/or closing delays will exceed the maximum acceptable threshold values, e.g., maximum opening and/or closing delay times. Different thresholds may be used to define the maximum acceptable opening and closing delays. Determining this information facilitates correct engineering of a firewall system so that it will handle the expected loads.

Different processors may be tested in a given firewall application to determine the maximum traffic load they can support for a maximum permitted closing and/or opening delay. By combining this information with expected traffic load information, processors are, in some implementations, selected based on the testing methods of the present invention to match anticipated traffic loads thereby permitting cost effective investment and hardware deployment.

The test methods of the present invention which are used to determine port opening and closing delays may be, and in some embodiments are, used in an active network. In such cases, the amount of test traffic generated at any given time is kept to a minimal amount to avoid interfering with actual traffic. A maximum closing delay threshold is set in some embodiments. The closing delay is monitored through limited testing on an ongoing and/or periodic basis. This may be done by establishing a call from a device having a particular IP addresses associated with it, directing probe signals at the range of ports which can be associated with the particular IP address and measuring opening and/or port closing times based on the time signals are detected passing through the firewall and/or stop passing through the firewall through one or more ports associated with the particular IP address being used for the test call. Closing delays approaching and/or exceeding the maximum acceptable closing delay are reported to the security management system. The security management system then takes steps to reduce the load on the firewall, e.g., by modifying network routing parameters to reduce the traffic directed to the firewall and/or by controlling the node in which the firewall is located to drop traffic, e.g., traffic above a pre-selected threshold. System administrators are notified of closing delay problems so that they can upgrade the affected firewall and/or take other steps to address firewall problems. Correlation from various firewall monitoring modules and/or other devices distributed throughout the network can be used to analyze in space and time when/where a security problem, such as excessive port closing delays, is occurring and feed the information into an analysis tool to identify a root cause of the problem and/or the location of the cause of the problem, thereby enabling further action.

During testing of a system in use, test probe signals are normally directed to the ports corresponding to a call which is established for testing purposes with care being taken to avoid directing signals to IP address/port combinations which may be used for other calls. Accordingly, the test call and probe test signals do not directly affect calls associated with IP addresses that are different from the one being used by the test device of the present invention.

In most but not all embodiments, the IIEPs of the present invention include both signal generation, e.g., traffic and test probe signal generation, capabilities as well as monitoring/analysis abilities. Thus, when used in pairs with one IIEP located inside the trusted zone and another located in the untrusted zone, it is possible to generate traffic in both directions and determine if the firewall operates properly in regard to each of a pair of uni-directional ports that may be involved in an established test call. The IIEPs of the present invention include sufficient logic that one device is able to initiate a call with each device then generating and transmitting test probe signals to check the status of the ports in each direction. The results of the firewall testing, determined by each of the IIEPs e.g., in regard to one direction of probe test signal flows, may be combined into a single report by the IIEPs which operate together in a synchronized manner. The analysis module in the IIEP on the trusted side of the firewall may perform this function.

Our inventive method may proceed in stages, by verifying pinhole operation according to a set of static rules (IP address and/or port rules) as well as verifying pinhole operation according to a set of dynamic rules, e.g., rules associated with opening and/or closing ports in response to session signaling in a timely manner. Our inventive method advantageously verifies the dynamic rule operation from a traffic source compliant with the static rules, adding further credence to the certification of proper dynamic rule operation and compliance.

It should be appreciated that specific potential security vulnerabilities that may be addressed through our inventive testing method include: 1) excessive delay in opening pinholes, resulting in an unintentional denial of service; 2) excessive delay in closing pinholes, creating a closing delay window of vulnerability; 3) measurement of the length of various windows of vulnerability; 4) setting a threshold on a window of vulnerability such that it triggers an alert when a predetermined value is exceeded; 5) determination of incorrectly allocated pinholes, resulting in a denial of service; 6) determining the opening of extraneous pinhole/IP address combinations through a firewall which increases the network vulnerability through unrecognized backdoors; and 7) determining the inability to correlate call state information with dynamically established rules in the firewall.

Advantageously, our inventive method is applicable to dynamic pinhole filtering as used in conjunction with specific VoIP protocols currently in use. More specifically, our method is applicable to the H.323 series of recommendations originating from the International Telecommunications Union (ITU) in versions 1 and 2, and the Session Initiation Protocol (SIP) defined by the Internet Engineering Task Force (IETF) in versions RFC 2543 and RFC 3261.

Numerous additional features and benefits of the methods and apparatus of the present invention will be apparent from the detailed description which follows.

DETAILED DESCRIPTION

Figure 1:
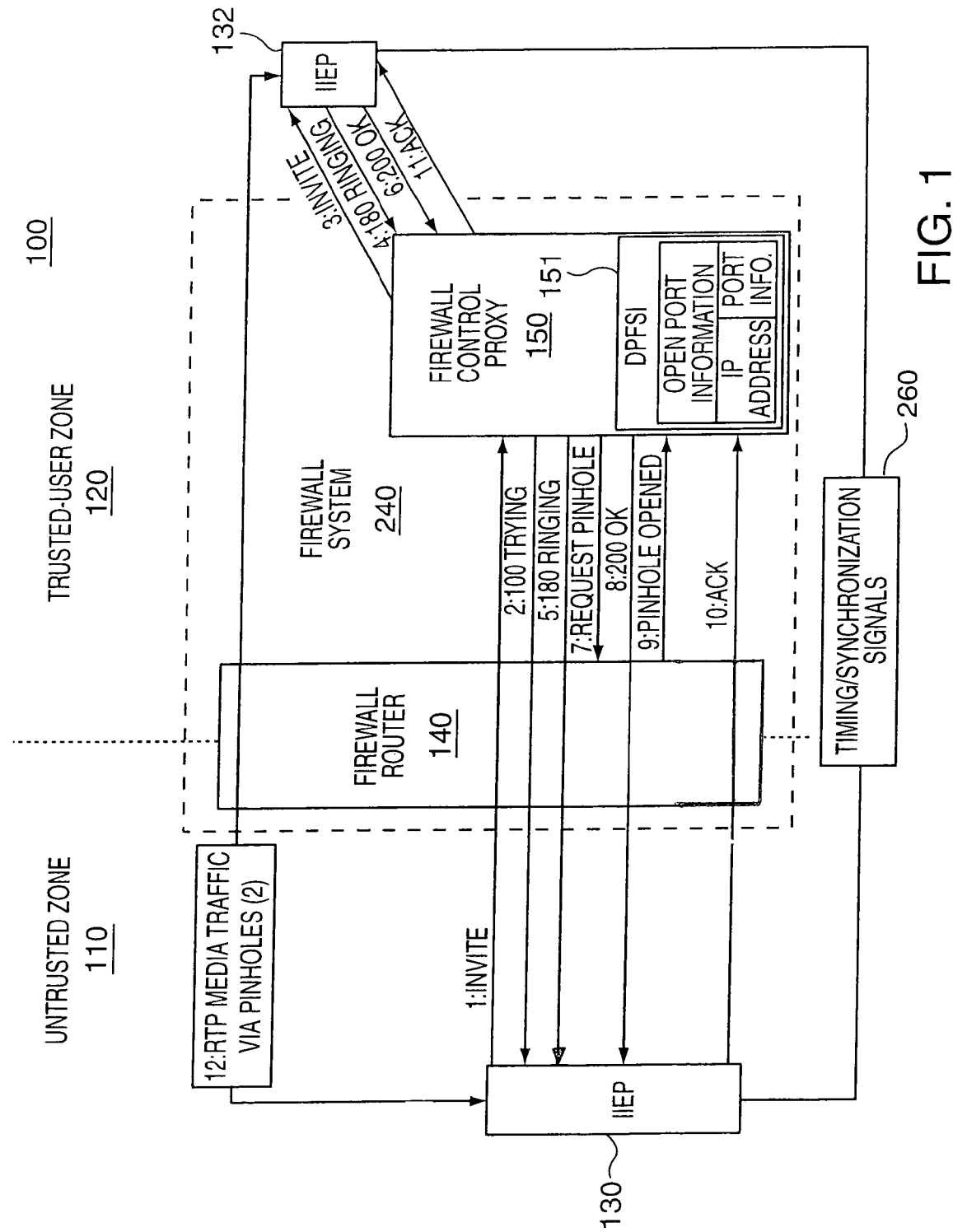
FIG. 1 illustrates a network arrangement according to the present invention for SIP call flows.

The present invention is particularly well suited for testing firewalls which open and close ports in a dynamic manner, e.g., to support session signaling such as for VoIP calls. In such applications, a firewall's ability to reject signals from IP addresses which have not initiated a media session, e.g., call, or are not being used in an ongoing media session is important. A firewall's ability to close and keep closed ports which are not being used in active media sessions, e.g., calls, and the ability to open and close ports to allow call signals to pass through on a dynamic, e.g., per call basis, in a timely manner are important to insure network security and a satisfactory level of service.

VoIP calls are commonly implemented using SIP or H.323 signaling to manage call establishment and termination. The methods and apparatus of the present invention are well suited for testing firewalls intended for either type of signaling application. For purposes of explaining the invention, the firewall testing methods and apparatus of the present invention will first be discussed in the context of a SIP application. As will become apparent, from the discussion which follows, the invention is not limited to SIP and can be used with a wide range of signaling protocols and firewall applications where ports in a firewall are opened and closed dynamically, e.g., H.323 protocol.

SIP calls are typically conducted in three steps, namely, 1) Call Registration, 2) Call Signaling, and 3) Call Media Exchange. The Call Registration and Call Signaling steps are both carried out using a well known port (p: 5060) and for which firewall static rules may be defined.

The signaling exchange includes a negotiation/selection of two logical ports (talking and listening), which then carry the media exchange (voice conversation) for a normal call. These talking and listening ports are dynamically chosen from a range of allowed ports, used for the duration of the call, and then released. Since they are chosen dynamically, their identification normally cannot be predicted in advance.

The port information can however, be determined from the specific signaling message(s) that include the logical port assignment functions (INVITE, 200 OK). Thus, the port information can be determined by monitoring and/or examining the appropriate messages as is done in various embodiments of the invention. Once this information is derived, a state machine may be constructed for the two logical ports involved in the call and/or a set of information indicating the status of the ports (open/closed) may be generated. The state of the call may then be monitored for the duration of the call. At the end of the call, corresponding messages (BYE) may be used to trigger the tear-down of the state machine and the closure of the two logical ports. The time between the BYE message and the actual closing of the ports should be relatively small and is monitored in accordance with the invention.

As can be appreciated, the determination of the port information and call-state monitoring which are used to trigger port closure is an important function for the proper operation of dynamic pinhole filtering. The architectural placement of these functions depends upon the processing power of the firewall involved and any performance and/or scalability requirements. Consequently, these functions may be implemented in, e.g., a router or other device such as device 140 shown in FIG. 1 which operates as a firewall, or distributed to an external server, e.g., proxy 150, that communicates to the firewall the identity of the ports to be opened and closed and the initiation of same. The incorporation of the firewall control proxy functionality 150 into the firewall 140 is largely an implementation issue which has little bearing on the test methods of the invention. For purposes of explaining the invention, a firewall 240 will be discussed with the understanding that this firewall 240 may be implemented as a single firewall device 140 which includes firewall control proxy functionality or as a combination of a firewall device 140 and a separate firewall control proxy 150.

With further reference now to FIG. 1, there is shown a VoIP network arrangement that we will use to describe our inventive test method. Specifically, network 100 includes both a trusted user zone 120 and an untrusted zone 110 separated by a firewall system 240. The firewall system 240, referred to hereafter as firewall 240, includes, a firewall 140 which may be implemented, e.g., as part of a router, and a Firewall Control Proxy (FCP) 150 which is coupled to the firewall 140. As discussed above, FCP 150 may be incorporated directly into firewall device 140. Shown further are Integrated Intelligent End Points (IIEPs) 130, 132 implemented in accordance with the present invention. IIEPs 130, 132 are placed at appropriate locations within the VoIP network. In particular, originating IIEP 130 is positioned "outside" of the firewall within the untrusted zone 110 and target IIEP 132 is positioned "inside" of the firewall within the trusted zone 120.

When implemented in the distributed manner shown in FIG. 1, dynamic pinhole function state information (DPFSI) 151 is not located in the firewall device 140, but rather in the external FCP 150 coupled to the firewall device 140. The external device, FCP 150, communicates the required port (pinhole) information to the firewall 140. The pinhole information 151 includes port information, e.g., source port address, destination port address, source port number, destination port number and protocol information for on-going media sessions, e.g., calls. Source and/or Destination IP address information may also be included in the pinhole information, e.g., DPFSI 151, so that a media signal associated with IP addresses which do not correspond to an active media session can be blocked, e.g., prior to performing filtering on port number information. In embodiments where the FCP functionality is included in the firewall 140, the firewall device 140 includes DPFSI 151.

Using a system 240 such as the one shown in FIG. 1, pinhole applications, such as those under consideration by the IETF MIDCOM working group which open and close ports in a firewall dynamically in response to session signaling, may be implemented using a combination of a firewall 140 and a firewall control device FCP 150. In VoIP applications, this FCP device 150 is normally application level aware and is able to forward messages to other Proxy machines or end stations. While signaling messages, e.g., call setup and termination messages, are statically allowed to pass through the firewall from "untrusted" sources, as outlined in a firewall rule set, ports for media traffic, e.g., voice signals, are dynamically opened and closed as indicated from messages sent from the FCP 150 with the DPFSI 151 reflecting the intended media port status at any given time.

So that the invention can be appreciated in the context of a VoIP call, a typical call flow initiated by a device in the untrusted zone 110 will now be explained with continued reference to FIG. 1. To further aid the reader in following the call flow, it is noted that each of the steps that comprise a call flow are numbered sequentially.

In our example, a call is initiated by originating IIEP 130 situated in the untrusted zone 110 by launching 1: Invite message through firewall 140 and then received by firewall control proxy 150. Although firewall control proxy is shown in FIG. 1 as a separate unit, it is possible that the functions provided by FCP 150 may exist in firewall 140, as an integrated unit as discussed previously.

Upon receipt of 1: Invite message by FCP 150, proxy 150 generates a 2: 100 Trying message and transmits it to originating IIEP 130 and also sends a 3: Invite message to destination IIEP 132, situated in trusted user zone 120.

Destination IIEP 132 then sends 4: 180 Ringing message back to FCP 150 which then sends a 5: 180 Ringing message through firewall 140 to originating IIEP 130. Message 6: 200 OK is transmitted from destination IIEP 132 to FCP 150 indicating that the call is being established. FCP 150 launches 7: 150 Request Pinhole message to firewall 140 and notifies originating IIEP 130 that call is being set up by forwarding 8: 200 OK message through firewall 140 to originating IIEP 130. When firewall 140 opens the requested pinhole, it sends 9: Pinhole Opened message to FCP 150. Lastly, originating IIEP 130 sends 10: ACK message through firewall 140 to FCP 150 where it is forwarded to destination IIEP 132 as 11: ACK message. At this point, the call is established, the pinhole is opened through firewall 140, and 12: RTP Media Traffic messages carry media, e.g., voice traffic, through the established pinhole, e.g., dynamically opened port(s) in the firewall 240.

A guiding thesis in the development of our inventive test method is that testing should verify that the firewall rule-sets and thus the firewall system 240 are properly filtering traffic based upon source and destination IP addresses, port numbers, and the protocol being used. The firewall interface should have ports used for media flows closed, except for those involved in an ongoing session, while those ports specifically used for signaling should remain open.

In theory, verifying that ports excluded by firewall rules are closed may be accomplished through the use of a port scanning tool or by reviewing firewall logs. Unfortunately, the design of the User Datagram Protocol (UDP) which is the foundation of Real Time Protocol (RTP), which is often used for SIP Media Traffic, usually makes the use of port scanners inconclusive in VoIP applications. In particular, SIP devices do not respond to UDP scans with the expected "ICMP-unreachable" messages which are the primary way to identify what ports are closed on a system. Because of this non-responsiveness, media ports will therefore appear to be open regardless of the actual state of the firewall pinholes. Consequently, open and closed pinholes will appear to be open, whether or not they have been filtered at the firewall. While firewall logs, e.g., copies of DPFSI information 151 with time information, can be used to approximate the window that these ports are open, there is no certainty that only appropriate traffic is being allowed to pass at a given time.

In accordance with the present invention, IIEPs (130, 132) can be used to accurately determine port status and firewall functionality. Advantageously, the IIEPs (130, 132) may have traffic generation (both VoIP traffic generation and scanning probes) and analysis tools incorporated within them. In addition, IIEPs (130, 132) should, and often do, possess the following capabilities: VoIP SIP traffic generation for both signaling and media; the ability to generate scanning probes; a promiscuous mode packet analysis; and timing and synchronization with an external clock thereby permitting accurate synchronization of IIEPs 130, 132 located inside and outside the firewall 240. Traffic generation may be peformed by soft-clients, e.g., one or more software modules or applications which are used to establish and terminate VoIP test calls.

Figure 2:
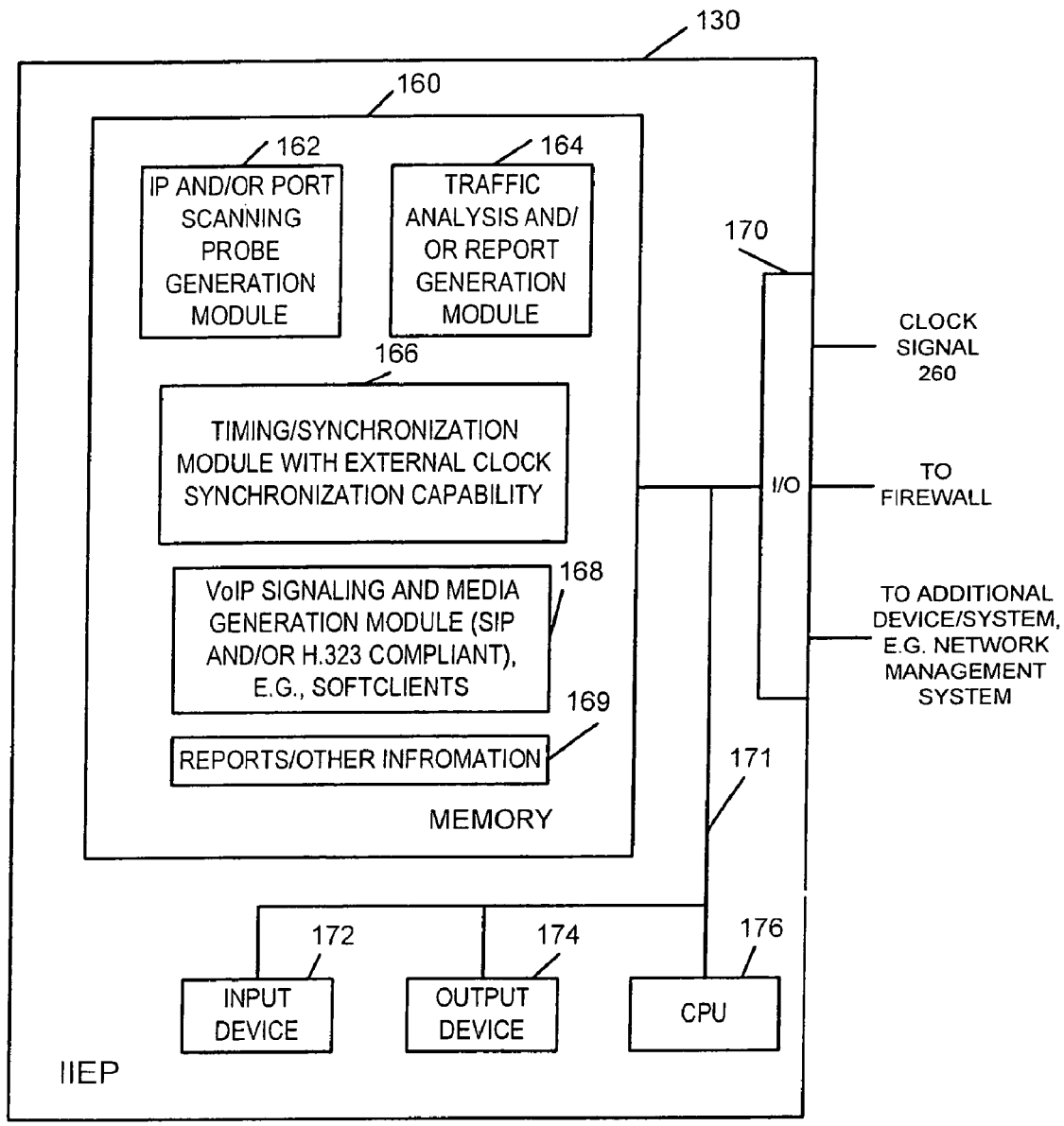
FIG. 2 illustrates a testing device which may be used as a source of firewall test signals an/or as a device for receiving and analyzing test signals which pass through a firewall being tested.

FIG. 2 illustrates an exemplary IIEP 130 which may be used as the IIEP 130 or 132 shown in FIG. 1. The IIEP 130 includes an input/output (I/O) device 170 which operates as an interface to the firewall 240 and to additional devices and/or systems, e.g., a network management system and/or external clock signal 260. The IIEP 130 also includes an input device 172, output device 174, processor, e.g., CPU, 176 and a memory 160 which are coupled together and to the I/O device 170 via a bus 171.

Input device 172 may be implemented as a keyboard through which a system administrator can enter commands and/or other data. Output device 174 may be implemented as, e.g., a display and/or printer, and can be used to display and/or print generated reports and information relating ongoing tests, monitoring and/or firewall test results. CPU 176 controls operation of the IIEP 130 including the generation of test signals and reports under control of one or more of the modules stored in memory 160 which are executed by CPU 176. Memory 160 includes reports and other information 169 which are generated by monitoring firewall status and performing various tests as discussed below. Various modules included in memory include an IP address and/or Port scanning probe generation module 162, a traffic analysis and/or report generation module 164, timing/synchronization module 166 and VoIP signaling and media generation module 168. IP and/or port scanning probe generation module 162 is used to generate test signals in accordance with the invention. Traffic analysis and/or report generation module 164 is used to analyze detected signals passing through the firewall and generate a report on firewall operation there from. Timing/synchronization module 166 is used to synchronize the operation of the IIEP 130 with another IIEP device, e.g., by synchronizing the IIEP operation to an external clock signal source 260, which is also used by at least one other IIEP device. VoIP signaling and media generation module 168 is used to generate SIP and/or H.323 compliant call setup and termination signals as required by the testing process of the present invention. While shown as software modules in FIG. 2, modules 162, 164, 166, 168 may be implemented using hardware, software, or a combination of hardware and software. In the case of full hardware implementations, modules 162, 164, 166, 168 are implemented using circuits outside of memory 160.

Figure 3:
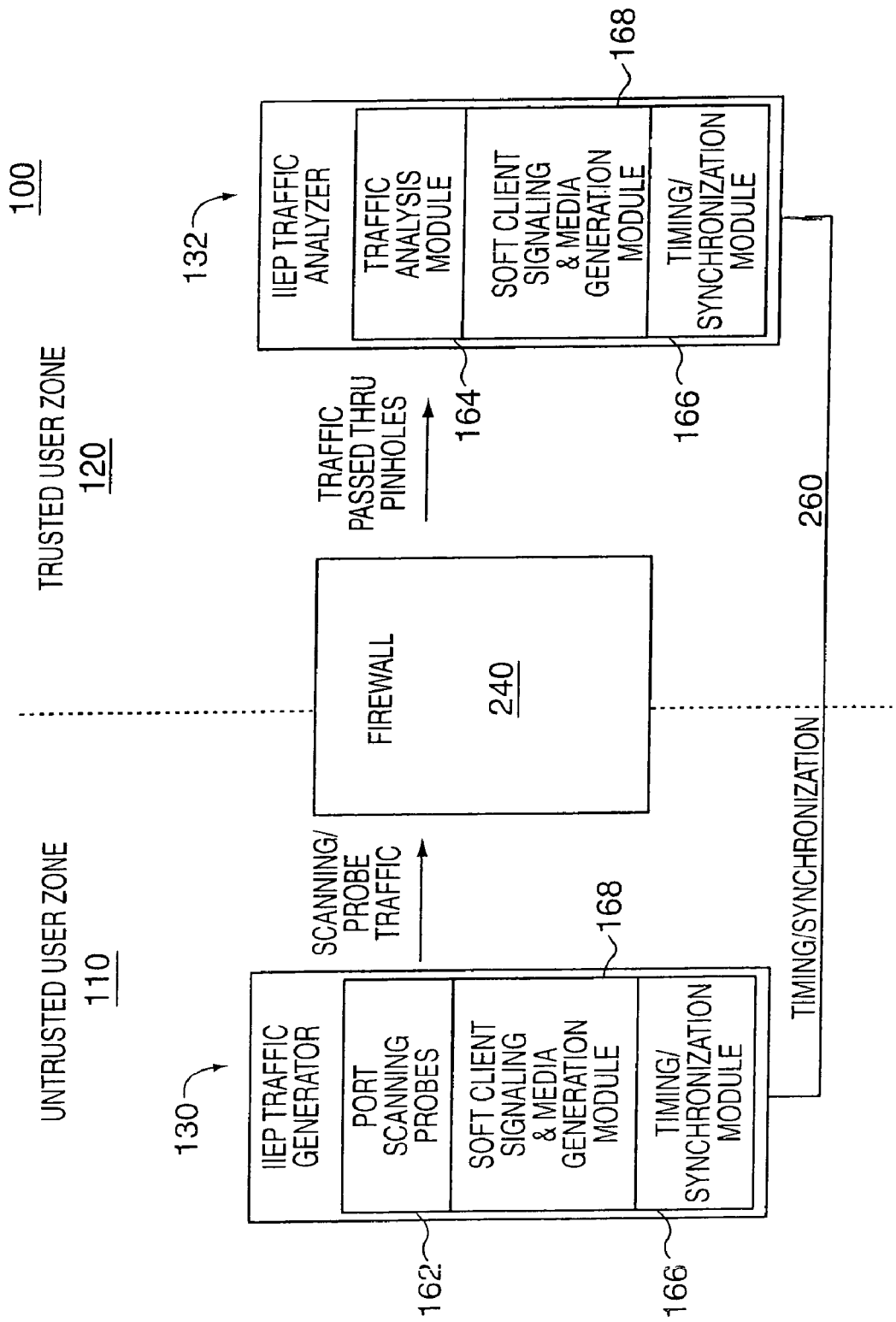
FIG. 3 is an alternative representation of the network of FIG. 1 with test signals directed to and passing through the firewall being shown.

Generally speaking, and as used with our method, IIEPs 130, 132 serve as traffic injection tools at a call generation end of a VoIP network and as a traffic analyzer at a target end of the call. Such an implementation is shown in FIG. 3. In such a case, traffic is launched into the VoIP network 100 at an originating end, e.g., in untrusted zone 110, and subsequently examined at a target end, e.g., inside trusted zone 120, to determine what portion of the launched traffic is able to traverse the firewall 240 and under what conditions. Advantageously, our inventive test method may be performed in stages, thereby permitting the test measurements made to be fine-tuned to varying degrees of granularity as may be needed for a particular application.

Turning our attention now to FIG. 3, there is shown a simplified schematic of the VoIP network 100 as tested by our inventive method. In particular, as in FIG. 1, the network 100 comprises both untrusted zones 110 and trusted zones 120, separated by firewall 240. IIEP Traffic Generator 130, located in untrusted zone 110, uses its port scanning module 162 and soft client signaling and media generation module 168 as well as its timing synchronization module 166. IIEP Traffic Analyzer 132, which is located in trusted zone 120, uses its traffic analyzer module 164 for processing detected traffic signals passing through the firewall 240 and soft client signaling and media generation module 168. Timing and Synchronization signals 260 are received from an external clock source and/or are exchanged between the IIEP Traffic Generator 130 and IIEP Traffic Analyzer 132 to support timing synchronization between the two IIEPs 130, 132. IIEP 132 may also use its port scanning probe generation module to generate probe signals from inside the firewall allowing IIEP 130 to monitor the status of ports used to communicate from inside the trusted user zone 120 to untrusted user zone 110. Thus, it is possible to test pairs of unidirectional ports associated with a call to determine opening and closing delays in each direction of signal flow.

According to our inventive method, in a first stage of testing, the firewall 240 is probed for compliance with static rules regarding accepted origination and destination IP addresses. Additionally, and as can be appreciated by those skilled in the art, it is important to verify that dynamic rule-sets are operating correctly as well. In order to verify that the dynamic rule-sets are operating correctly, one or more of the following parameters should be varied through the use of traffic generation outside the firewall and detection within the trusted user zone 120:

Source and Destination Addresses (including addresses on the trusted 120 and untrusted 110 sides of the firewall 240, across the supported address ranges);
Source and Destination Port Numbers (Across the supported UDP and TCP range);
and IP Protocol Numbers.

In one firewall implementation, IP addresses not legitimated by SIP signaling as being associated with a call should be rejected regardless of the port being accessed. Thus, for a media signal having an IP source address that is not listed in the DPFSI information 151, the firewall should block the signal regardless of the port which is being accessed. As a result, when the scanning probe generation module 162 of the originating IIEP 130 launches test signals from an IP address not associated with a current call, the firewall's media ports should be completely closed to those scans originating from the unassociated addresses, e.g., the IP address which is not listed in DPFSI information 151. Accordingly, in such a situation, the scanning probe should not be detected across the firewall 240 by the target IIEP 132, as such traffic, e.g., test signals, should be blocked by the firewall at the IP address filtering state of the firewall filtering process.

In the next stage of testing, and to verify that media ports that are not defined within the firewall rule-set and not currently dynamically allocated are closed, traffic is generated across the supported UDP and TCP port ranges from a source having a legitimated IP address, while monitoring this traffic on the destination end. The IP address from which these test signals are launched is legitimated by initiating a media session, e.g., call, from the IP address prior to generating the port test signals. In particular, the IIEP probe generation module 162 of IIEP 130, has an IP address associated with it. This specific IP address is used to launch a call, thereby legitimating the specific IP address, and resulting in a pair of legitimately opened pinholes, e.g., uni-directional pinholes, associated with it. From that specific IP address however, no traffic directed to any other port used for media traffic should be visible by the IIEP analysis module 164 at the destination end assuming proper operation of firewall 240.

More specifically, the port scanning probe generation module 162 of the traffic generator 130 probes the full TCP and UDP range with test signals directed at the firewall's media ports using its legitimated IP address as the source address for the test signals. The IIEP analysis module 164 of the IIEP 132 analyzes arriving traffic that passed through the firewall 240 and discriminates between allowed traffic—according to the firewall rules—and searches for the presence of traffic from the originating IIEP Traffic generator 130 addressed to any ports other than the port or ports which were associated with the call established by the source IIEP 130. The expected result is that no traffic other than that addressed to ports dynamically set for the established call should appear at the IIEP traffic analysis module 164 of the IIEP 132 at the destination end. Accordingly, the presence of traffic proceeding through any ports other than those dynamically allocated is indicative of a failure in the pinhole implementation and will be reflected in a report generated by the analysis and report generation module 164 of IIEP 132.

As may now be appreciated by those skilled in the art, there exists a component to the "window of vulnerability" that results from the closing delay of the pinhole during the time period between a call effectively ending and a firewall, being instructed, closing the pinhole. During this "window" component, scanning traffic may still be able to "punch-through" and use the pinhole.

It should be noted that the "window of vulnerability" has at least two components, namely, the actual duration of the call when malicious traffic may penetrate the firewall and the closing delay window which, as defined above, is the period of time between the call ending and the firewall closing the pinhole. Of course, if malicious traffic interrupted a call during its progress, such call disruption may alert the user or customer to an intrusion. Unfortunately however, detecting malicious traffic during the closing delay window of vulnerability (CDWoV) is not so straightforward therefore its duration is important to quantify. Fortunately, our inventive method makes this determination.

Figure 4:
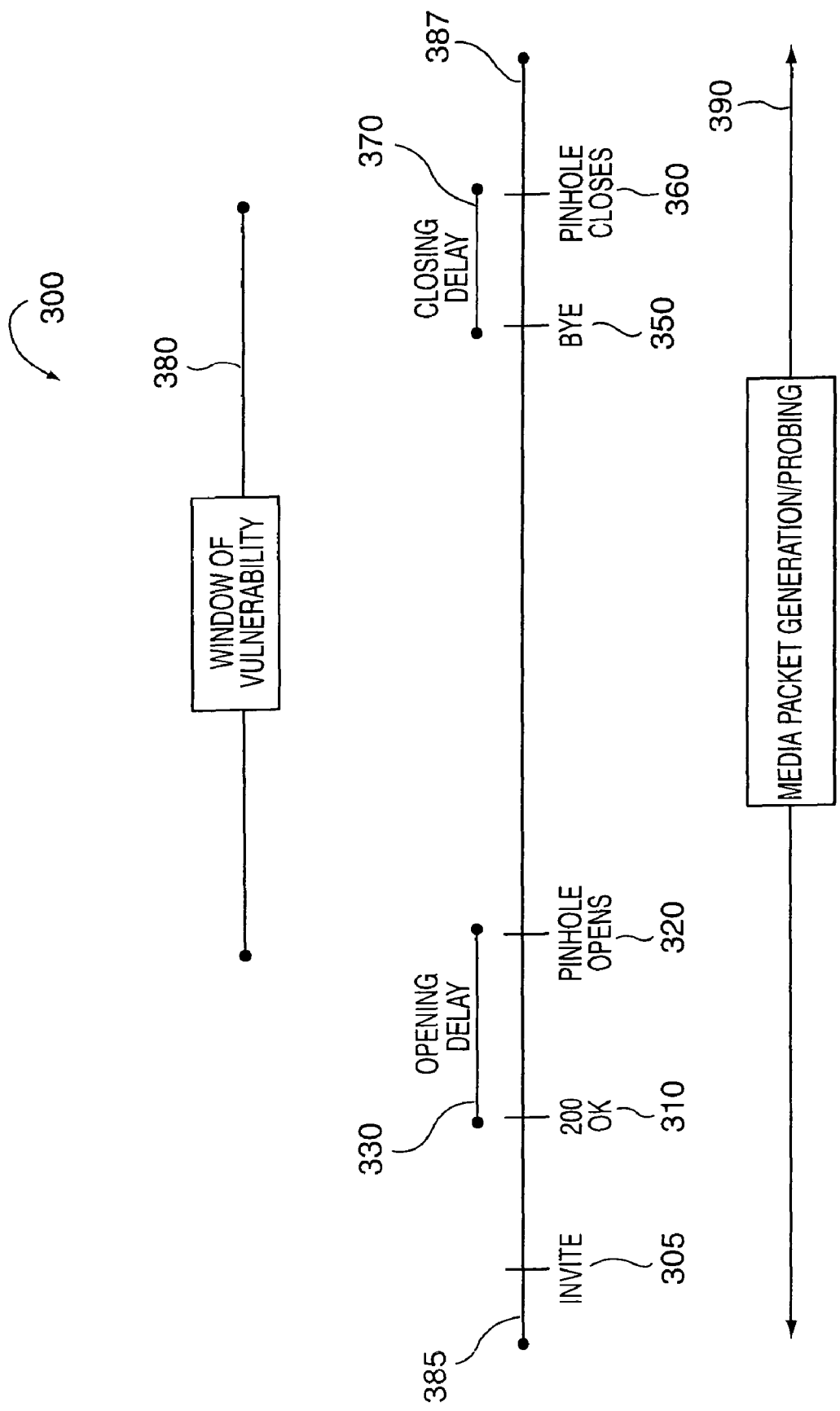
FIG. 4 is a timeline depicting various SIP signaling points and a window of vulnerability associated with opening and closing ports in response to SIP signaling.

As noted before and now alternatively stated, the "window of vulnerability is that period of time beginning when a first media packet is allowed to pass through a firewall pinhole and ending when a last packet is able to pass through. With reference now to FIG. 4, there is shown a timeline 300 depicting "window of vulnerability" 380 for a SIP based call. Specifically, the timeline 300 shown therein depicts the window of vulnerability 380, as that period of time between the pinhole opening 320 and the pinhole closing 360.

Of particular interest in a SIP call and as shown in FIG. 4, is opening delay 330 and closing delay 370. With continued reference to FIG. 4, the opening delay 330 is that period of time between the receipt of an "200 OK" message 310 and the opening of the pinhole 320, and the closing delay 370 is that period of time between the transmission of a "BYE" message 350 and the pinhole actually closing 360.

Of additional interest from a timing perspective are the time periods between an INVITE message and corresponding "200 OK" messages being sent by IIEPs (130 and 132 respectively), to when the window opens at call initiation 320, and the time period between the sending of the "BYE" message 350 to the window's actual closing—subsequent to call termination. Fortunately, these values may be determined, by streaming packets at the pinhole, from a time prior to its opening until after the pinhole's closing and detecting the passage of signals through the pinhole, e.g., port or ports assigned to be used for a call being established. The start of packet streaming at ports to detect pinhole opening is shown in FIG. 4 as point 385 while stopping of streaming of packets is shown at point 387. The time interval between the start of packet streaming to detect pinhole opening 385 and the stoppage of packet streaming to detect pinhole opening 387 is identified as media/packet generation/probing interval 390 in FIG. 4.

Advantageously, our inventive SIP testing method can be used to verify a number of important aspects of calls proceeding according to timeline 300 including:
 a) the speed with which a firewall will correlate information from the INVITE/200 OK messages (305, 310) and the opening of the pinhole 320, thereby identifying potential "throttling" of calls; and
 b) the length of time a pinhole remains open after a call has terminated, or "closing delay" 370.

In our inventive method, the Closing Delay Window of Vulnerability (CDWoV) may be determined from the time the last packet sent from an originating IIEP 130 is detected by a target IIEP 132, less the time of the BYE message generation. In practice, there are at least two factors that will affect the closing delay window, and in particular, the firewall processing the information from a BYE packet, and the existence of a timeout default in the absence of a BYE packet. Additionally, the amount of processing needed to process this information in real-time is dependent upon the speed at which the pinhole is closed and therefore the "width" of the CDWoV. Generally, an overloaded system will not be able to carry out these functions within established specifications.

The test methods of the present invention can be used to determine the effect of large loads, e.g., numerous simultaneous or nearly simultaneous requests, to open and/or close pinholes may have on the ability of a firewall 240 to open and close ports in a timely manner. To load the system for purposes of performing stress testing, the IIEP 130 operates as a bulk traffic generator. The volume of requests to open and close ports can be slowly increased permitting for stress testing and thereby permitting the benchmarking of performance for the firewall's CPU, beyond which the Closing Delay Window of Vulnerability will become so large and so persistent, due to CPU degradation, that the firewall system 240 is no longer effective. This benchmarking can be done to predict how closing window delays will vary based on traffic load. Plots of closing window delay versus traffic load (pinhole open/closing request signals) can be useful in determining maximum acceptable traffic loads based on a selected maximum acceptable closing delay for a particular firewall system 240, e.g., for a firewall with a particular fixed CPU speed.

Other benchmarking that can be performed can be firewall CPU speed vs. traffic load that can be supported given a pre-selected maximum closing delay. This benchmarking of CPU speed vs. maximum traffic load can have widespread use in engineering VoIP networks, as important criteria for performance will be determined by establishing upfront the correct match between an interface rate, and the processing power of a firewall CPU needed to maintain the dynamic pinhole filtering functionality for that given rate at the perimeter protection devices exposed to that traffic load. Traffic engineering information generated by stress tests implemented in accordance with the invention can be a useful new tool for security companies and other service providers trying to design and maintain firewalls which can support dynamic firewall operations for various traffic loads.

Firewall stress testing implemented in accordance with the invention is intended to be performed off-line in a testing environment and not in a live system as the stress-testing is likely to cause disruptions to a real-time system and interfere with actual network traffic. However, as will be discussed below, limited testing of firewall operation can, and in various embodiments is, performed in accordance with the present invention in operational systems as part of a security management system.

To perform stress testing, two IIEPs 130, 132 are situated on either side of the firewall 240 as shown in FIG. 3 for the SIP case. The H.323 system will look functionally the same for stress testing, e.g., the setup shown in FIG. 6 may be used. The originating IIEP traffic generator 130 operates in bulk mode during maximum stress testing injecting traffic, e.g., signals to cause pinholes to open and/or close, at the maximum rate allowed by the firewall interface. The target IIEP 132 monitors the ever lengthening of the Closing Delay Window of Vulnerability as the firewall CPU is stressed by increasing amounts of traffic and becomes unable to process the "close pinhole" messages, e.g., due to firewall CPU overloading.

A graphic display of the Closing Delay Window of Vulnerability is generated in some embodiments on the IIEP's output device providing an indication of the cutoff point at which the firewall's CPU can no longer process the dynamic pinhole filtering function in a timely manner, leaving pinholes open for increasingly longer times. From the graphic display a system administrator can determine a maximum permissible traffic flow above which traffic is to be cutoff to maintain proper firewall operation. Upon encountering the cutoff threshold in an actual implementation, traffic is dropped. A new CPU may be added to the firewall device, or to FCP, in order to return system to normal performance within specifications at actual level of loading encountered.

Figure 5A:
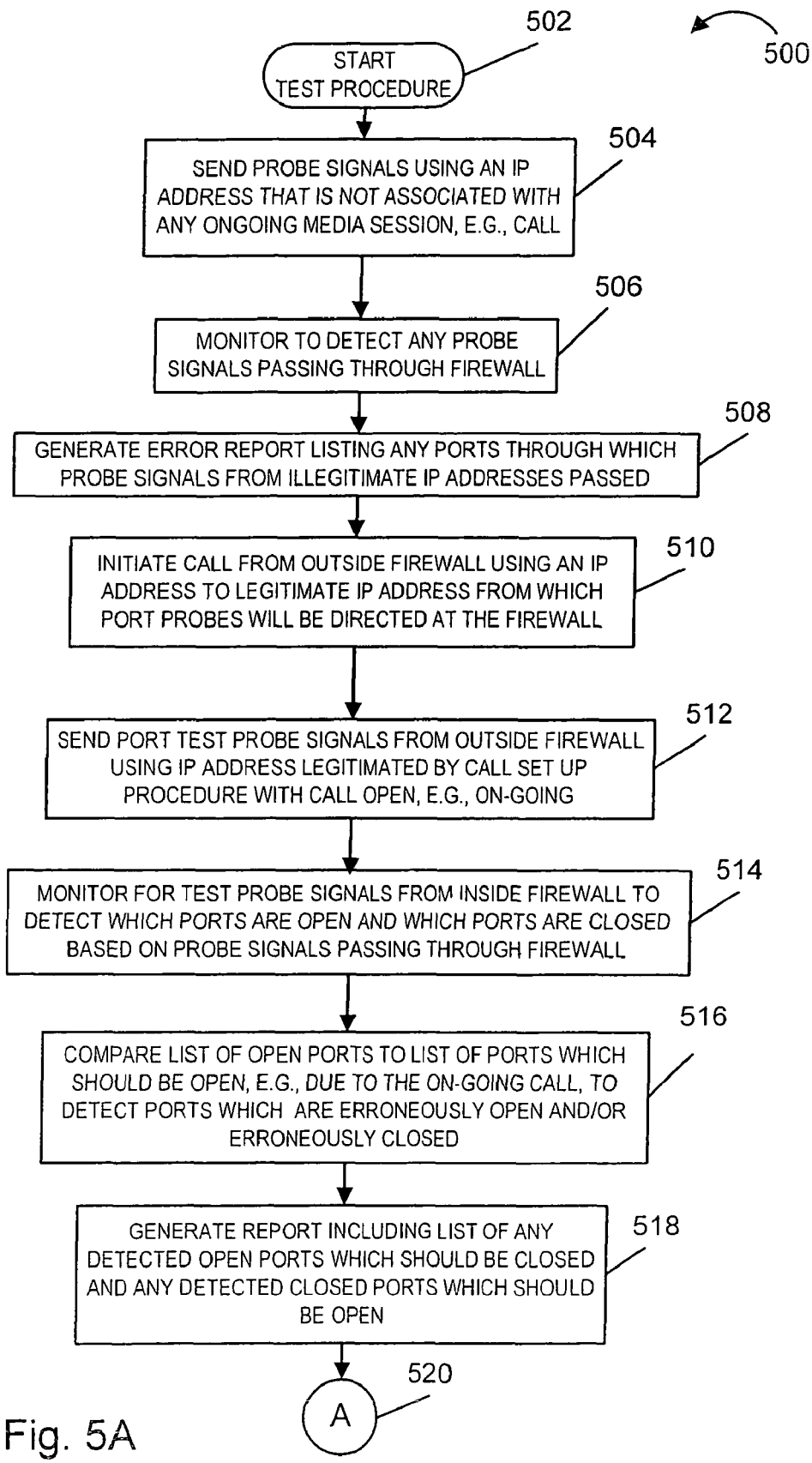
FIG. 5, which comprises the combination of FIGS. 5A and 5B, is a flow chart illustrating the steps of an exemplary firewall test method implemented in accordance with the invention.
Figure 5B:
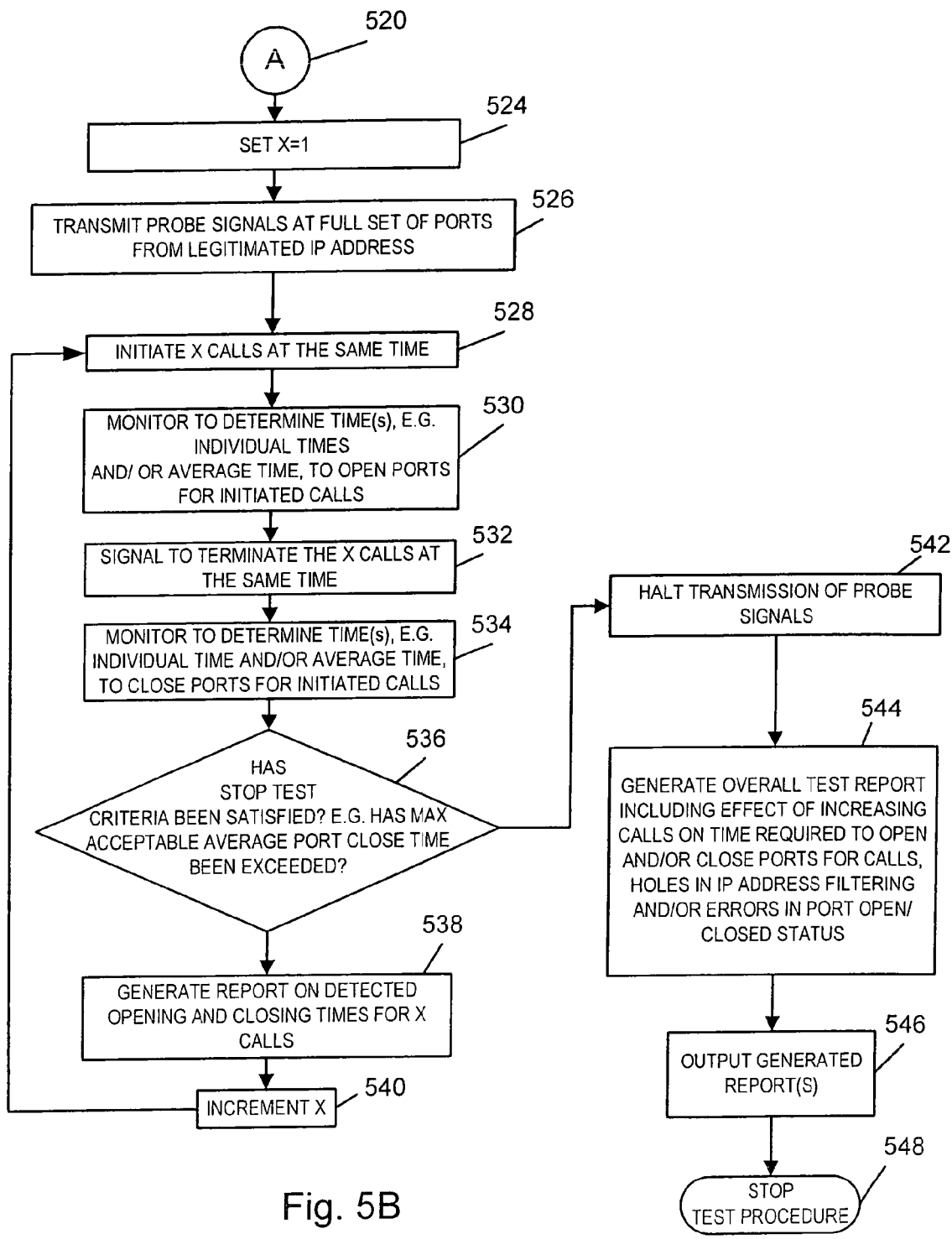

FIG. 5, which comprises the combination of FIGS. 5A and 5B, illustrates the steps 500 of an exemplary firewall test method of the present invention. The method 500 is applicable to both SIP signaling applications and H.323 applications but for purposes of explaining the invention will be discussed in the context of the SIP compatible testing system shown in FIG. 3. The method includes steps for testing both static firewall rules as well as dynamic firewall filtering, e.g., filtering corresponding to the opening and closing of pinholes. Static rule testing is performed first. The testing method concludes with testing based on increasing volumes of traffic which provide stress based test results and information about pinhole closing delays corresponding to different levels of traffic, e.g., levels of signaling used to cause pinholes to be opened and/or closed.

The testing method 500 begins in start step 502 wherein IIEPs 130, 132 are initialized. In step 504, the traffic generator IIEP 130 sends probe signals directed at the firewall 240 using as a source address, an IP address that is not associated with any ongoing media session, e.g., a call. Since the IP address has not been legitimated through SIP session signaling, it will not be listed in DPFSI information 151 and the probe signals should be blocked by firewall 240. In step 506, the target IIEP 132 monitors to detect any probe signals passing through the firewall that were generated in step 504. Next, in step 508 an error report is generated by the destination IIEP 132 listing any ports used for media traffic through which probe signals from the illegitimate IP address passed.

With testing of the firewall's ability to block signals from IP addresses which have not be legitimated through session signaling completed, operation proceeds to step 510 wherein a session signal, e.g., call establishment signaling, is initiated by the signal generator IIEP 130 using an IP address associated with IIEP 130. As a result of this signaling, the firewall system 240 will assign one or more ports, e.g., a pair of ports, to be used with this specific IP address for the call being established and a corresponding IP address and port information entry will be made in DFSI information 151. Once legitimated in this manner, the specific IP address associated with IIEP signal generator 130 will be used to transmit test probes at the full set of ports supported by the firewall 240 through which media traffic can be directed. In regard to the port assigned for call signals from the trusted zone 120 to the untrusted zone 110, an IP address assigned to the IIEP 132 will be indicated as the source address in DFSI information 151 and the IP address associated with IIEP 130 may be indicated as a destination address.

In step 512, the signal generator IIEP 130 sends port test probe signals directed at the port(s) capable of carrying media signals from outside the firewall 240 using the IP address legitimated in step 510. Then, in step 514, the IIEP 132 monitors to detect test probe signals which pass through the firewall to detect port opening time(s) and to determine which ports are open and which ports are closed. Then in step 515 a port opening delay is determined from the time a signal is detected passing through the opened port and the time of a signal used to initiate port opening. A list of open and closed ports generated in step 514 is compared in step 516 to a list of ports which should be open, e.g., a list of ports included in DFSI information 151. In this manner, in step 516, ports which are erroneously open and/or closed are detected.

Next, in step 518, the IIEP 132 generates a report including a list of any detected open ports which should be closed and any detected closed ports which should be open. Operation proceeds from step 518 to step 524 via connecting node 520.

In step 521, as session signal to terminate the initiated call is generated. Then, in step 522, the IIEP 132 monitors to determine when probe signals stop passing through port(s) associated with the initiated call. Next, in step 523, at least one port closing delay is determined from the time difference between a signal used to initiate port closing and the actual closing of the port as indicated by the cessation of signals passing through the port(s) associated with the call being terminated. With the opening and closing delays having been determined for the single test call, in step 524 probe signals directed to the ports corresponding to the terminated test call are stopped. Then, in step 525, a control signal generation control parameter X is initialized to 2.

Step 525 marks the start of firewall load testing. The parameter X controls the number of calls opened or closed at a given point in time. As will be discussed below, this number is incremented to achieve stress testing beyond the case of low load testing, e.g., as in the case of a single call setup and close procedure.

Operation proceeds to step 528 wherein X calls are initiated at the same time causing X ports in the firewall to be opened in each direction. In step 529 the IIEP 130 acting as a test signal generator transmits probe signals to the full range of firewall ports which can be used to communicate media, e.g., voice, signals for the IP addresses used to initiate the test calls. Then, in step 530 the IIEP 132 monitors to determine the time(s) and corresponding port opening delays, corresponding to individual calls and/or an average time, to open the ports for the calls initiated in step 528. Next, in step 532 the signal generator IIEP 130 generates session signals to terminate the X calls started in step 528. Then, in step 534, the destination IIEP 132 monitors to determine the closing delay associated with individual calls and/or to determine the average closing delay for the X calls being terminated. The IIEP 132 can determine the time of port closing by detecting when probe signals cease to penetrate the firewall through a port associated with one of the X calls, while the start time from which the closing delay can be determined from the time of a session signal used to trigger the closing of the port.

With the closing delay times and/or average closing delay having been determined for the X calls in step 534, operation proceeds to step 535 wherein generation of the test probe signals associated with the IP addresses used to initiate the X calls are terminated. Then in step 536 a report is generated on the detected opening and closing times for a load corresponding to X calls.

Next, in step 538, a check is made to determine if a stop criterion has been satisfied. The stop criteria may be a maximum average port closing delay to which the average generated in step 534 is compared. If a stop criterion has been satisfied in step 538, e.g., a stop threshold was meet or exceeded, operation proceeds to step 544. However, if a stop criterion was not satisfied in step 538 operation proceeds to step 540 wherein X is incremented prior to operation proceeding again to step 528, e.g., for testing at a higher level of loading. X may be incremented by a small or large step size depending on the desired resolution, in terms of load size, of the statistics indicating increased loading effects.

As mentioned before, upon some preselected stop criteria being satisfied in step 538, operation proceeds to step 544 wherein an overall test report is generated. The overall test report includes information indicating holes in IP address filtering detected in the static firewall rule testing steps, detected errors in port open/closed status that were detected, opening and/or closing delays for a single call, and/or information indicating the effect of increasing loads, e.g., calls, on the time required to open and/or close ports in the firewall 240. The report is output in step 546 e.g., in the form of printed and/or displayed charts and/or text information listing the detected errors and pinhole opening and closing delays for different loads.

With the generated reports being output by the IIEP 132, the test procedure stops in step 548.

Advantageously, as discussed above the inventive methods of the present invention are not limited to specific protocols. In particular, it is well suited to H.323 based calls as well as others. H.323 calls and signaling will now be briefly discussed to facilitate an understanding of how the test methods of the present invention can be used in H.323 based systems. As will become apparent, the FIG. 5 test method is applicable to firewall systems that work with H.323 signaling.

H.323 calls are typically conducted in three steps, namely, 1) Call Registration, 2) Call Signaling, and 3) Call Media Exchange. The Call Registration and Call Signaling steps are carried out using well known port(s) (p: 1719/1720) which are the same and for which firewall static rules may be defined.

The session establishment signaling exchange includes a negotiation/selection of two logical ports (talking and listening), which carry the media exchange (voice conversation) for a normal call. These talking and listening ports are dynamically chosen from a range of allowed ports, used for the duration of the call, and then released. Since they are chosen dynamically, their identification normally cannot be predicted in advance.

They can however, be determined from the specific signaling message(s) that include the "open logical channel" function (H.225/H.245 OpenLogicalChannel, H.225/H.245 OpenLogicalChannel ACK). The port information may be determined by examining the appropriate messages. Once this information is derived, a state machine may be constructed for the two logical ports involved in the call and the state of the call may then be monitored for the duration of the call. An information table, the same as or similar to, the DPFSI 151 shown in FIG. 1 is normally also constructed in the firewall system 641 shown in FIG. 6. At the end of the call, corresponding messages (CALL RELEASE) may be used to trigger the tear-down of the state machine and the close of the logical ports just used for the call.

As can be appreciated, the determination of the port information and call-state monitoring are two functions which are important for the proper operation of dynamic pinhole filtering. The architectural placement of these functions depends upon the processing power of the firewall involved and any performance and/or scalability requirements as in the case of the SIP implementation previously discussed. Consequently, and as noted before with SIP architectures, these functions may be implemented for H.323 architectures in a firewall device 640, or distributed to an external firewall control proxy 650 that communicates to the firewall device 640 the identity of the ports to be opened and closed and the initiation of same as shown in FIG. 6.

Figure 6:
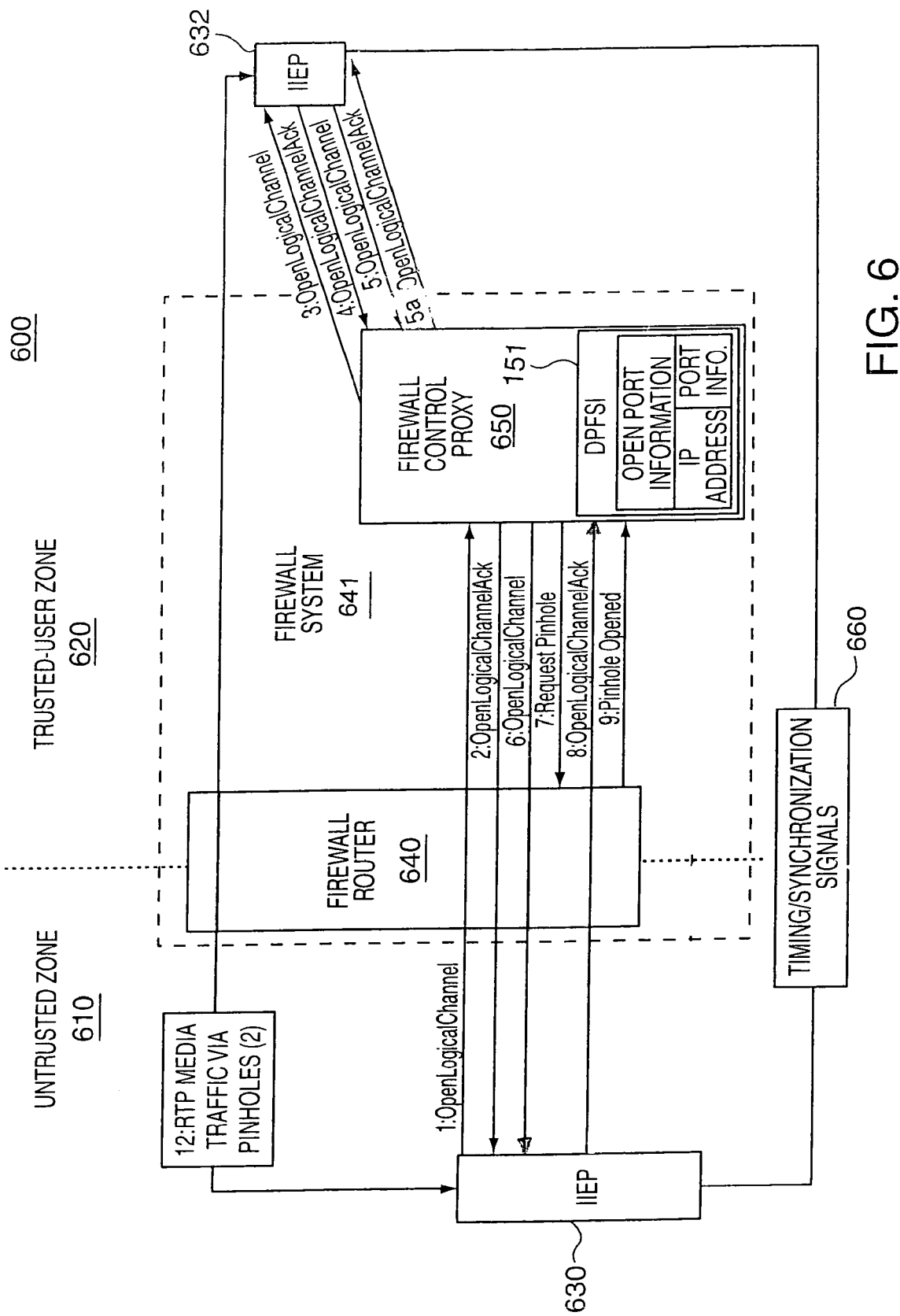
FIG. 6 depicts a network test arrangement according to the present invention which may be used to test firewall operation in the case of H.323 signaling.

Turning our attention now to FIG. 6, there is shown a VoIP network arrangement 600 that we will use to describe our inventive test method as it applies to the H.323 protocols. Specifically, network 600 includes both a trusted user zone 620 and an untrusted zone 610 separated by a firewall device 640. The firewall device 640 operates in conjunction with firewall control proxy 650 as a firewall system 641 which may be referred to simply as the firewall 641.

Shown further are Integrated Intelligent End Points (IIEPs) 630, 632, placed at appropriate locations within the VoIP network 600. In particular, originating IIEP 630 is positioned "outside" of the firewall within the untrusted zone 610 and target IIEP 632 is positioned "inside" of the firewall within the trusted zone 620.

As with the SIP protocols described earlier, the IIEPs (630, 632) used for H.323 protocols may have traffic generation (both VoIP traffic generation and scanning probes) and analysis tools incorporated within them. Additionally, H.323 IIEPs should possess the following capabilities: VoIP SIP traffic generation (softclients) for both signaling and media; the ability to generate scanning probes; a promiscuous mode packet analysis; and timing and synchronization with an external clock. The exemplary IIEP 130 shown in FIG. 2 may be used in the system 600 as any one of the IIEPs 630, 632. In such an embodiment, the IIEP 130 generates signals compliant with H.323.

Generally speaking, and as noted before, IIEPs 630, 632 serve as traffic injection tools at a call generation end of a VoIP network 600 and as a traffic analyzer at a target end of the call. As such, traffic is launched into the VoIP network at an originating end and subsequently examined at the target end to determine what portion of the launched traffic is able to traverse the firewall 641 and under what conditions. As with the SIP method, our inventive method for H.323 protocols may be performed in stages.

A typical H.323 call flow can be understood with continued reference to FIG. 6. Specifically, a call is initiated by originating IIEP 630 situated in the untrusted zone 610 by launching 1: OpenLogicalChannel message through firewall device 640 which is then received by FCP 650. As noted before with the SIP method(s), the functions provided by FCP 650 may be integrated into firewall device 640.

Upon receipt of 1: OpenLogicalChannel message by FCP 650, FCP 650 generates a 2: OpenLogicalChannel ACK message and transmits it to originating IIEP 630 and also sends a 3: OpenLogicalChannel message to destination IIEP 632, situated in trusted user zone 620.

Destination IIEP 632 then sends 4: OpenLogicalChannel ACK message back to FCP 650 and then sends a 5: OpenLogicalChannel message to FCP 650. FCP 650 then sends a 5a: OpenLogicalChannel ACK message to IIEP 632 and a 6: OpenLogicalChannel message through firewall device 640 to originating IIEP 630.

FCP 650 launches 7: Request Pinhole message to firewall device 640. Originating IIEP 630 acknowledges the channel opening with 8: OpenLogicalChannel ACK message sent to FCP 650. When firewall device 640 opens the requested pinhole, it sends 9: Pinhole Opened message to FCP 650.

At this point, the call is established, the pinhole is opened through firewall 641, and 12: RTP Media Traffic messages carry media through the established pinhole.

According to our inventive method and similar to that described for the SIP protocol, in a first stage of testing, the firewall 641 is probed for compliance with static rules regarding accepted origination and destination IP addresses. Additionally, and as can be appreciated by those skilled in the art, it is important to verify that dynamic rule-sets are operating correctly as well. In order to verify that the dynamic rule-sets are operating correctly, the following parameters may be varied in traffic generation:

Source and Destination Addresses (including addresses on the trusted 620 and untrusted 610 sides of the firewall 641, across the supported address ranges);

Source and Destination Port Numbers (Across the supported UDP and TCP ranges);

and IP Protocol Numbers.

According to our method, IP addresses not legitimated by H.323 signaling as being associated with an ongoing media session, e.g., call, should be rejected regardless of the port being accessed. Additionally, when the scanning probe generation module 162 of the originating IIEP 630 is launched from an IP address not associated with a current call, the firewall ports used for media traffic should be completely closed to those scans originating from the unassociated IP addresses. Accordingly, in such a situation, the scanning probe signals should not be detected across the firewall 641 by the target IIEP 632, as such traffic should be blocked by the firewall 641 at the IP address level of filtering.

In the next stage of H.323 testing, and to verify that ports that are not currently allocated to a media session are closed, traffic is generated across the full UDP and TCP port ranges from source 630 having a legitimated IP address, while monitoring this traffic on the destination end at IIEP 632. In particular, the IIEP 630 which operates as a traffic generator, having an IP address associated with it, is used to launch a call that will have a pair of legitimately opened pinholes, e.g., ports, associated with it. From that specific legitimated IP address however, no traffic directed to other ports used for media flows should be visible to the analysis module of the IIEP 632 at the destination end.

More specifically, the scanning probe signals launched from the IIEP 630 which operates as a test signal generator uses the legitimate IP address to probe the full TCP and UDP range of ports which may be used for media traffic. The IIEP 632 operating as a traffic analyzer performs analysis on the arriving traffic that passes through the firewall 641 to detect which ports were erroneously opened and/or closed. The expected result is that no traffic other than that addressed to ports associated with the established call should appear at the IIEP 632 at the destination end. Accordingly, the presence of traffic proceeding through any ports used for media flows other than those dynamically allocated as part of the established call is indicative of a failure in the pinhole implementation.

Figure 7:
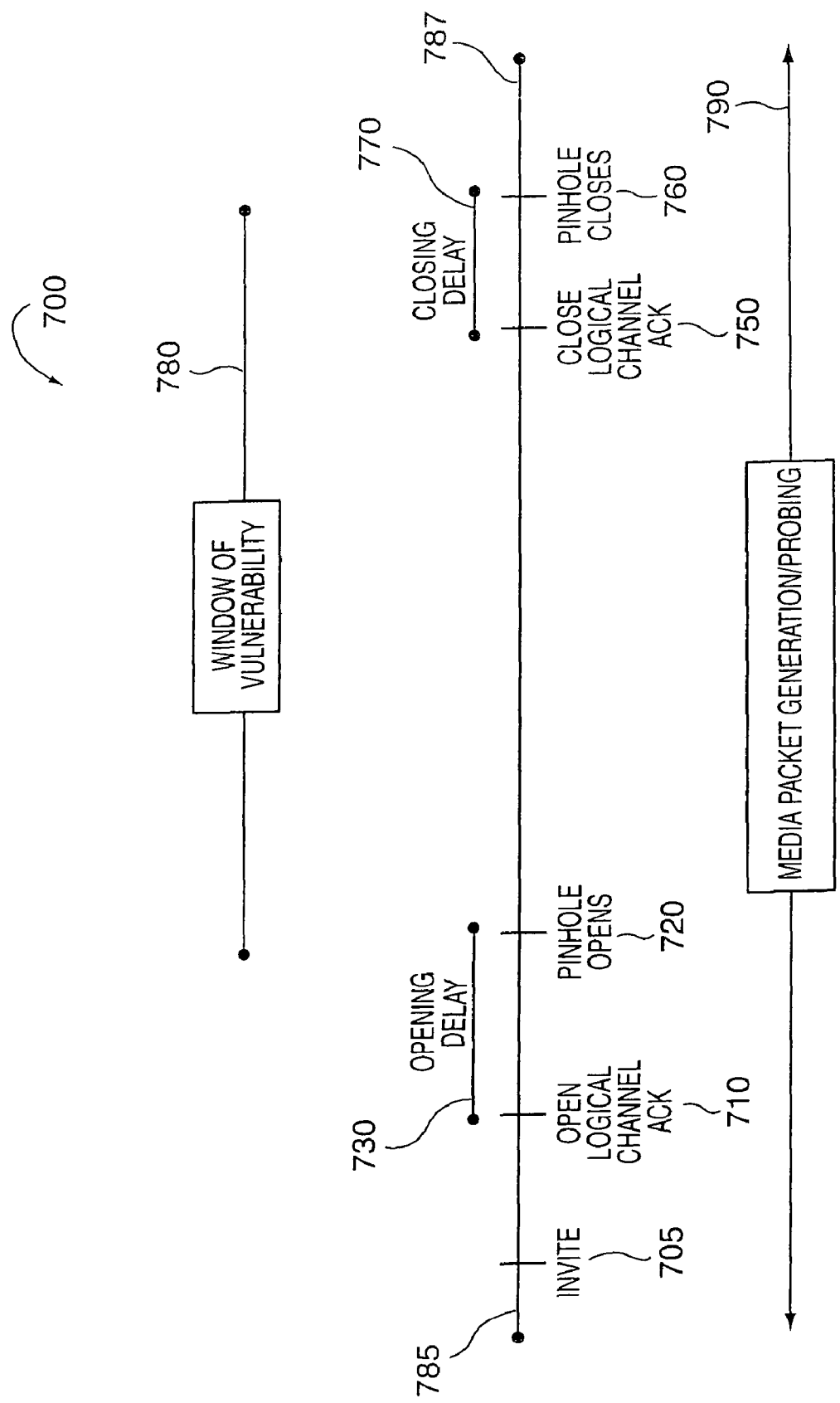
FIG. 7 is a timeline illustrating various H.323 signaling points and a window of vulnerability associated with opening and closing ports in response to H.323 signaling.

With reference to FIG. 7, which shows a timeline of H.323 call events and resulting windows of vulnerability and delays, the opening delay 730 may be measured as the period of time between the receipt of an "OpenLogicalChannel ACK" message 710 and the opening of the pinhole 720, while the closing delay 770 can be measured as the period of time between the transmission of a "CloseLogicalChannel ACK" message 750 and the pinhole actually closing 760.

Of additional interest for the H.323 protocol are the time periods between an CallSetUp/CallProceeding message and corresponding "H.225/H.245 OpenLogicalChannel/OpenLogicalChannel ACK" messages being sent by IIEPs 630, 632, to when the window opens at call initiation 720, and the time period between the sending of the "H.225/H.245 CloseLogicalChannel/CloseLogicalChannel ACK" message 750 to the window's actual closing—subsequent to call termination. Fortunately, and according to our inventive method, these values may be determined by streaming packets at the pinhole, from a time prior to its opening until after the pinhole's closing, a media packet generation/probing time interval 790 of FIG. 7. Start and end time of media packet generation/probing time interval 790 are shown on the timing diagram 700 of FIG. 7 as points 785 and 787 respectively.

Advantageously, and similar to the advantages for the SIP method described before, our inventive H.323 testing method verifies a number of important aspects of calls proceeding according to timeline 700 including:

the speed with which a firewall will correlate information from the H.225/H.245 OpenLogicalChannel/OpenLogicalChannel ACK messages (710) and the opening of the pinhole 720, thereby identifying potential "throttling" of calls; and the length of time a pinhole remains open after a call has terminated, or "closing delay" 770.

As used with the H.323 protocol, the Closing Delay Window of Vulnerability (CDWoV) may be measured as the time the last packet sent from an originating IIEP 630 is detected by a target IIEP 632, minus the time of the CloseLogicalChannel message generation. As before, there are at least two factors that will affect the closing delay window, and in particular, the firewall processing the information from a H.225/H.245 CloseLogicalChannel/CloseLogicalChannel ACK packet, and the existence of a timeout default in the absence of a H.225/H.245 CloseLogicalChannel ACK packet.

Of course, the amount of processing needed to process this information in real-time is dependent upon the speed at which the pinhole is closed and therefore the "width" of the CDWoV. Generally, an overloaded system will not be able to carry out these functions within established specifications, and an alert may be generated when a predetermined threshold width of the CDWoV is met or exceeded in a system which monitors for such delays while in use as will be discussed below.

Figure 8:
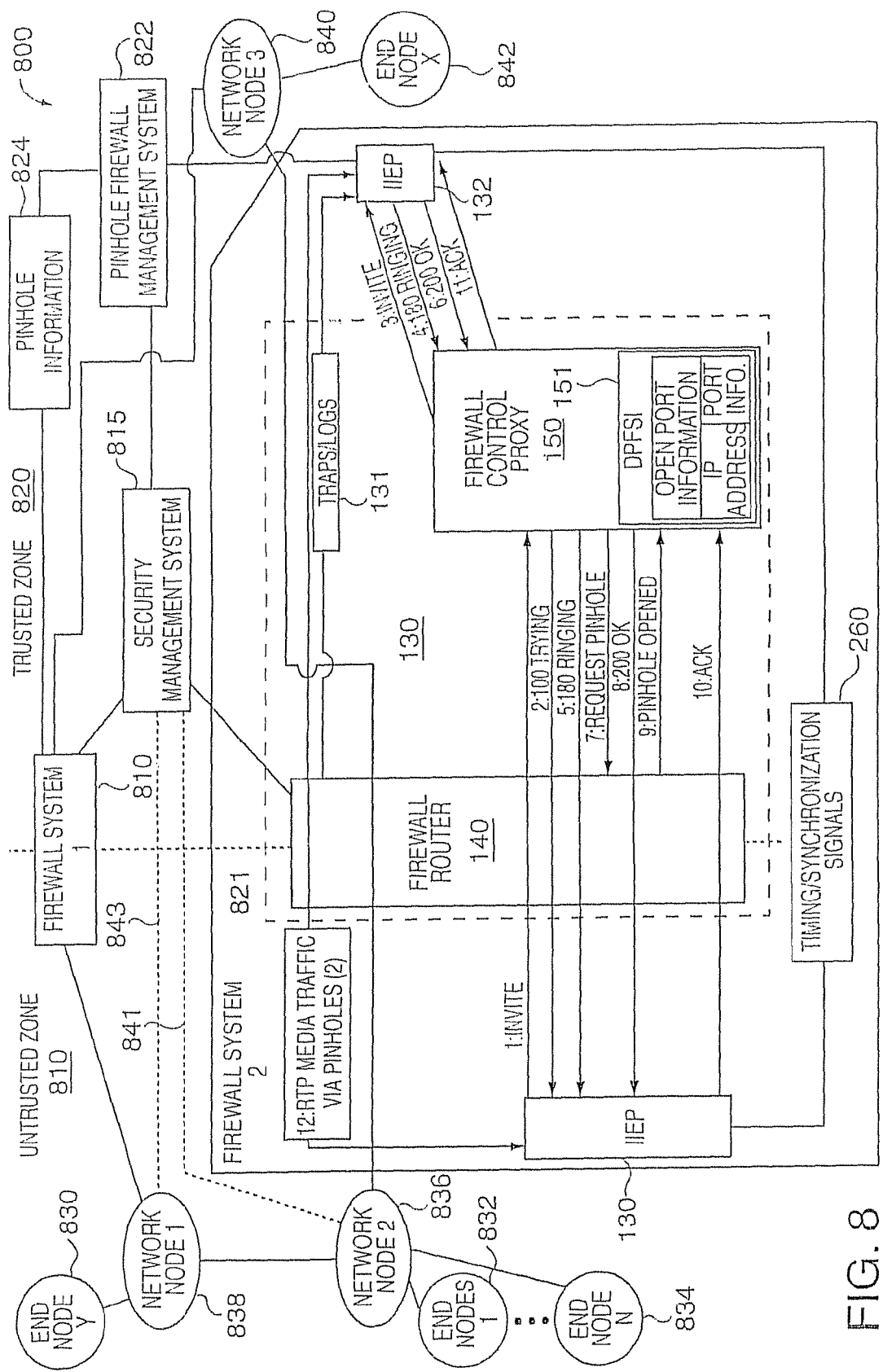
FIG. 8 illustrates an active system subject to firewall monitoring and security control implemented in accordance with one embodiment of the invention.

FIG. 8 a communications network system 800, wherein the firewall testing and firewall control methods of the present invention are used in an active communications network to detect firewall faults, excessive opening and/or closing delays and to generate alert signals which are used to alert a security management system to firewall problems. In response to receiving a firewall alert signal, the security management system 815 can take one or more of a variety of actions to address the firewall problem.

The communications network 800 includes an untrusted zone 810 and a trusted zone 820. First and second firewall systems 810, 820 are used to separate the untrusted zone 810 from the trusted zone 820. The untrusted zone 810 includes a plurality of nodes, e.g., end node Y 830 and end nodes 832, 834. End nodes may be, e.g., user terminals or other user devices. End node 830 is coupled to the first firewall system 810 by network node 1 and to the second firewall system 820 by network node 2. Network nodes may be e.g., routers, which route traffic according to routing information including, in some cases weights associated with particular paths. End nodes 832 and 834 are coupled to the second firewall system by network node 2 836 and to the first firewall system 810 through network node 1 via its connection to network node 2 836. Thus, end nodes 830, 832, 834 have two available paths over which media signals can be routed into the trusted network zone 820.

Trusted network zone 820 includes a security management system 815 which has routing control links 841, 843 to network nodes 836, 838. It is also coupled to firewall system 1 810 and firewall system 2 820. In addition the security management system 815 is coupled to a pinhole firewall management system which generates alarms that are sent to the security management system 815 when a pinhole closing delay is detected to have been exceeded at one of the firewall systems 810, 820. Pinhole firewall management system 822 receives pinhole information 824 form each of the firewall systems 810, 820 and generates alarms as needed. The first and second firewall systems 810 and 820 are both coupled to the third network node 840 which, in turn, is coupled to end node X 842. Thus, the end nodes on both sides of the trusted zones have multiple paths through which messages can be communicated between the trusted and untrusted zones 820, 810. Security management system 815 can take several actions in response to receiving a closing delay alarm including signaling the firewall device 140 which triggered the alarm to drop or refuse to pass new session requests to thereby reduce loading, signal system administers to upgrade or take other action in regard to the firewall system 810, 821 which generated the alarm and or signal network routers 838, 836 to modify the network routing to reduce the load on the firewall which trigger the alarm. In this manner, assuming the threshold for generating the alarm is set at a level where security has not yet been jeopardized due to excessive delays, corrective measure can be taken before a security problem occurs.

Each of the first and second firewall systems 810, 820 includes a firewall 130 as well as IIEPs 130, 132. In the active network embodiment, the IIEPs provide ongoing and/or periodic testing using signaling which places relatively little loading on the firewall system 130. Thus, during active system use, stress testing is avoided to reduce the risk of interfering with legitimate traffic passing through the firewall system 130. In the active system embodiment, care is taken to avoid directing test signals to ports which are in used for ongoing media sessions as indicated by DPFSI information 151 and to avoid stress testing. Otherwise, testing may be performed in the same way as described with regard to the FIG. 5 example. In some embodiments, testing of active systems is limited to determining closing delay. In some cases, this is done by having the IIEP 132 monitor signaling and port closing log information 131 obtained from firewall device 140. In such an embodiment transmission of test signals from IIEP 130 can be minimized or avoided. In other embodiments opening and/or closing delays are determined by the IIEP 132 through the use of test signals as previously described.

Figure 9:
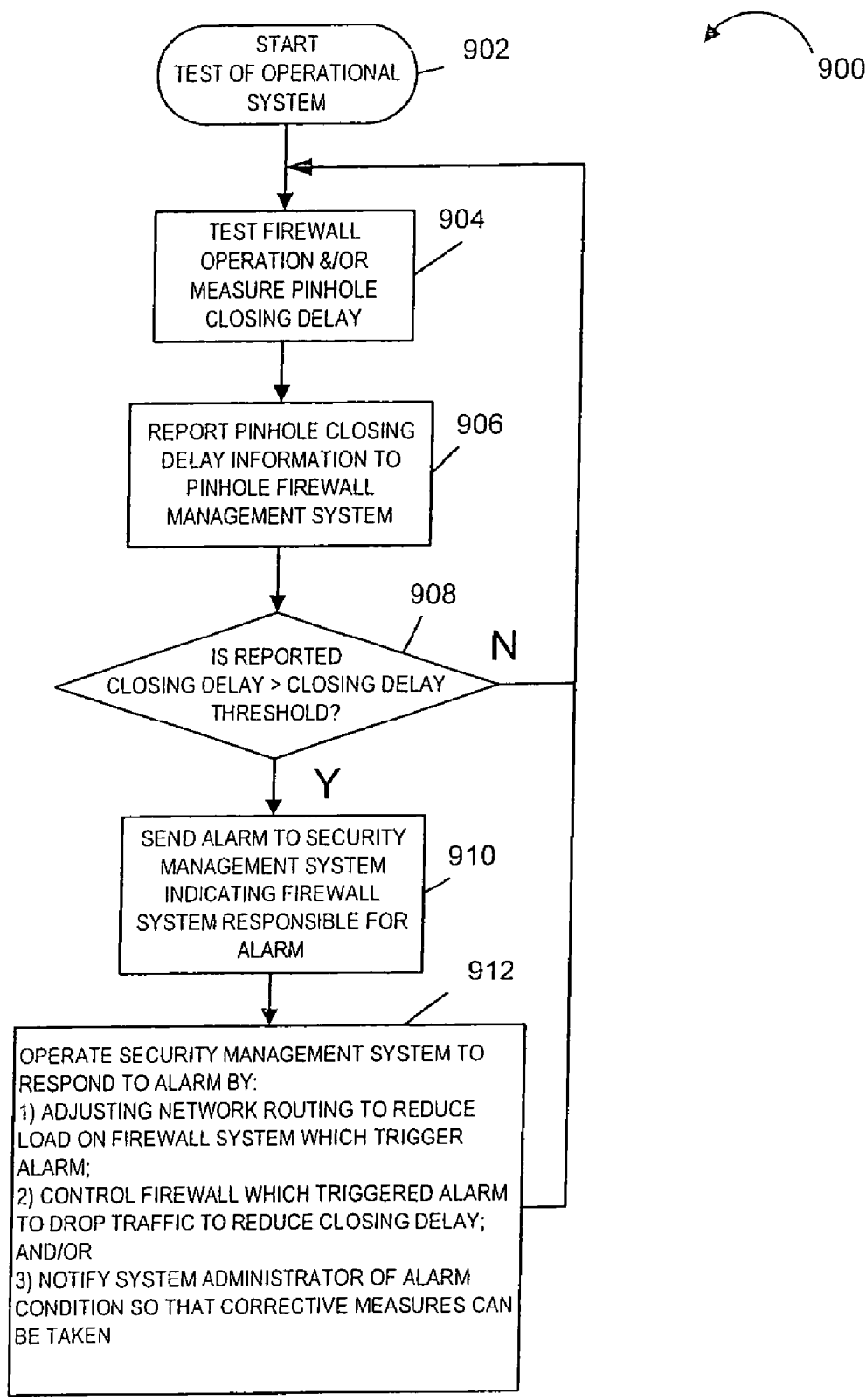
FIG. 9 illustrates the firewall monitoring and security steps performed in an active network in accordance with one embodiment of the present invention.

FIG. 9 illustrates the firewall monitoring and security steps 900 performed in an active network in accordance with one embodiment of the present invention.

The monitoring/testing process 900 begins in step 902 with operation proceeding to step 904 wherein firewall operation is tested and/or the current pinhole closing delay associated with at least one communication session is established. Next, in step 906, the determined pinhole closing delay is reported to the pinhole firewall management system 822. The pinhole firewall management system 822 compares the reported closing delay to a threshold, e.g., a predetermined threshold slightly below the maximum acceptable pinhole closing delay. If the threshold is not exceeded no alarm is generated and monitoring operation continues from step 904.

However, if the closing delay threshold is exceeded, indicating a loading or other firewall problem, operation proceeds to step 910. In step 910 and alarm is generated and sent to the security management system 815. The alarm signal normally indicates the firewall that was responsible for the generation of the alarm, i.e., the firewall 810 or 821 exhibiting large port closing delays.

The security management system 815 responds to the alarm by performing one or more actions including: 1) adjusting network routing to reduce the load on the firewall system 810 or 821 which triggered the alarm; 2) control the firewall system 810 or 821 which triggered the alarm to re drop traffic or refuse new sessions to reduce the closing delay and/or 3) generate a signal or other output to notify a system administrator of the alarm condition so that corrective measures can be taken such as upgrading of the firewall system 810 or 821 which generate the alarm.

Operation proceeds from step 912 back to step 904 so that monitoring of the firewall system can continue while the network 800 remains in operation.

Thus, a system 800 implemented in accordance with the invention can monitor to make sure that the windows of vulnerability remain within criteria according to a design specification, with the issuance of alarms in the event of threshold crossings of windows of vulnerability permitted widths and/or excessive closing delays. The system will alert security monitoring personnel in real-time when a firewall system 810, 821 is leaving open windows of vulnerability that can be exploited by an intruder to gain access to network. This methodology is equally applicable to H.323 and SIP based systems. The testing method of the invention can be used to monitor whether a firewall implementation is working properly during operation, free of software malfunctions, or is subject to problems because of intermittent faults when the firewall system 810, 821 is performing at the limit of its traffic capabilities. The monitoring system 822 is a real-time system that monitors firewall interfaces at periodic intervals or on a continuous basis feeding information up to the security management system 815.

The testing component set up may be generally the same as that described in regard to FIG. 1. The setup shown in FIG. 8 can work with SIP or H.323 signaling.

In various implementations, the two IIEPs 130, 132 are situated on either side of the firewall device 140 which is included in each of the first and second firewall systems 810, 821. The originating IIEP 130 sends test traffic probes periodically across the firewall device 140. The purpose of the intermittent test probes is to obtain measurements of the CDWoV and to verify that illegitimate traffic originated from the IIEP 130 will not pass through the firewall device 140. These measurements are performed using the previously described methodologies. It is likely that as the firewall device 140 is stressed with user traffic, the window of vulnerability may increase or the firewall 140 may be breached by packets that have not been validated through signaling. Either event should be detected resulting in a report to the pinhole firewall management system 822 and generation of an alarm which is sent to the security management system 815.

Security management system 815, in some embodiments, operates as a root cause analysis tool which uses logic, e.g., one or more analysis software modules, to process alarm signals received from the alarm generation components of various firewalls over a period of time. The analysis is used to locate the cause, e.g., source of signals, causing one or more alarms. The security management system 815 also includes a module for predicting future alarms so that preventive actions, e.g., upgrading of firewall hardware, can be taken.

Thus, in at least some embodiments the security management system 815 includes a receiver for receiving alarms from a plurality of different alarm generation devices located at different locations, e.g., in different firewalls and a module for analyzing alarms received from different alarm generation devices, over a period of time, to identify the location of one or more traffic sources causing alarms during said period of time. The security management system 815 also includes another module or uses the same analysis module to analyze alarms received from different alarm generation devices, over a period of time, to predict the occurrence of future security alarms. Thus, the security management system 185 uses distributed probes, e.g., test probes at different firewalls through out the communications network which result in different alarms being received and uses time and space information corresponding to the information obtained from said probes to feed into a root-cause analysis tool that helps sectionalize a pinhole vulnerability problem in time and space for further action in a "predictive" and/or "reactive" manner.

A graphic display of the CDWoV widths may be, and often is, generated and used to indicate the threshold point at which a firewall CPU can no longer process the dynamic pinhole filtering function according to specifications, leaving pinholes open for increasingly longer times. The graphic display may be used to indicate dynamically at the pinhole management system 822 when this threshold has been exceeded and to generate an alert (e.g., an authenticated SNMPv3 trap) which can be sent up to a monitoring device capable of understanding traps.

The methodology and management system 822 can be used to correlate information from multiple firewall systems 810, 821, which may be implemented as MIDCOM systems, from devices 151 which control the "pinholes" within the firewalls, and end-to-end testing devices 130, 132 used to intermittently verify the functionality and vulnerability of the complete firewall system 810, 821. The information from multiple devices can be correlated and fed into a "root analysis" tool that will provide spatial information of where anomalies are occurring within the overall network 800.

It will be apparent to those skilled that many variations to our inventive methods may be realized. In particular, numerous alternative network architectures and/or protocols may be tested by those skilled in the art without departing from the spirit and scope of the present invention.

What is claimed is:

1. A method of testing a firewall comprising:
   transmitting session termination signals used to terminate established communications sessions;
   monitoring to determine port closing delays, said port closing delays being a delay in time between the time a session termination signal is transmitted and the time a port in said firewall is closed in response to the transmitted session termination signal;
   transmitting session termination signals at an increased rate through said firewall to cause the closing of ports in said firewall; and measuring the effect of said increased rate of session termination signals on closing delay times associated with closing ports in response to transmitted session termination signals.

2. The method of claim 1, further comprising:

generating a report indicating the effect of an increasing rate of session termination signals on port closing delays.

3. The method of claim 1, wherein said transmitting session termination signals at an increased rate includes transmitting more termination signals at a given time than are transmitted during said step of transmitting, session termination signals used to terminate established communications sessions.

4. A method comprising:

transmitting a session signal to terminate an ongoing communications session being conducted through at least one port of a network firewall; and measuring a port closing delay time associated with closing of said at least one port following the transmission of said signal to terminate said communications session.

5. The method of claim 4, wherein said port closing delay time is a time period which occurs between a time a signal used to cause the closing of the port is detected and said port ceases to allow communications signals to pass through from a first side of said firewall to a second side of said firewall.

6. The method according to claim 5, further comprising the steps of:

transmitting test signals at said port prior to said port ceases to allow communications signals to pass; and monitoring to determine when said test signals cease passing through said port.

7. The method of claim 4, wherein said session signal is at least one of SIP or H.323 compliant signals.

8. An apparatus, comprising:

a transmitter to send session signals used to initiate a communications session to be conducted through a firewall to be tested and to terminate the communications session after initiation, wherein the transmitter is configured to send probe signals directed at firewall ports;

a timing synchronization module to synchronize operation of the apparatus to at least one of an external clock source or another apparatus;

a memory to store a time of transmission of a session signal to terminate the communications session and a time that probe signals are detected to stop passing through a port in said firewall; and a processor to determine at least a port closing delay based on the time of transmission of a session signal to terminate the communications session and the time that probe signals are detected to stop passing through the port in said firewall corresponding to the communications session.

9. The apparatus of claim 8, wherein the processor is to determine at least a port opening delay from a session signal time associated with a session signal used to initiate a communications session and a time probe signals are detected to start passing through a port in said firewall corresponding to the initiated communications session.

10. A system comprising:

a firewall;

a network device comprising:

a transmitter to send communications session termination signals and probe signals directed at a first side of said firewall;

a processor to detect the probe signals having passed through said first side of said firewall to a second side of said firewall and to determine a port closing delay as measured from a time the processor detects a signal used to close a port in said firewall to a time said processor ceases to detect test signals passing through the port of said firewall; and a memory to store the time the processor detects the signal used to close the port in the firewall and the time the processor ceases to detect test signals passing through the port of the firewall.

11. The system of claim 10, wherein a communications session is established through the firewall using session initiation signals prior to the transmitter sending at least some of the probe signals.

12. The system of claim 11, wherein the network device includes a timing synchronization module to synchronize sending probe signals according to an outside clock source.

13. A method of testing a firewall, comprising the steps of:

transmitting session termination signals used to control termination of communications sessions through said firewall at an increasing rate; and measuring the effect of the increasing rate of session termination signals on port closing delays associated with the termination of communications sessions through said firewall.

14. The method of claim 13, further comprising determining the session signal rate which results in a maximum acceptable port closing delay being exceeded.

15. The method of claim 14, wherein said transmitted session signals are at least one of SIP signals or H.323 signals.

* * * * *